United States Patent [19]

Bullivant

[11] Patent Number: 5,074,368

[45] Date of Patent: Dec. 24, 1991

[54] SELF-CALIBRATING APPARATUS FOR ARTICLE INPUT AND REMOVAL MONITORING SYSTEM

[75] Inventor: Kenneth W. Bullivant, Chadds Ford, Pa.

[73] Assignee: K-Tron Technologies, Inc., Wilmington, Del.

[21] Appl. No.: 607,680

[22] Filed: Nov. 1, 1990

Related U.S. Application Data

[60] Division of Ser. No. 467,516, Jan. 18, 1990, Pat. No. 5,000,274, which is a continuation-in-part of Ser. No. 299,062, Jan. 19, 1989, abandoned, which is a continuation-in-part of Ser. No. 245,947, Sep. 18, 1988, Pat. No. 4,819,015, which is a continuation of Ser. No. 157,985, Feb. 19, 1988, which is a continuation of Ser. No. 874,159, Jun. 13, 1986, abandoned.

[51] Int. Cl.[5] ...................... G01G 19/52; G01G 23/10

[52] U.S. Cl. ....................................... 177/50; 177/185

[58] Field of Search ................................. 177/50, 185

[56] References Cited

U.S. PATENT DOCUMENTS

| | | |
|---|---|---|
| 3,060,370 | 10/1962 | Varterasian . |
| 3,164,013 | 1/1965 | Schmahl et al. . |
| 3,411,347 | 11/1968 | Wirth et al. . |
| 3,423,999 | 1/1969 | Wirth et al. . |
| 3,621,713 | 11/1971 | Wirth et al. . |
| 3,724,573 | 4/1973 | Saner . |
| 3,805,605 | 4/1974 | Saner . |
| 4,157,738 | 6/1979 | Nishiguchi et al. . |
| 4,300,648 | 11/1981 | Gallo et al. . |
| 4,316,516 | 2/1982 | Kupper ............................ 177/50 X |
| 4,336,854 | 6/1982 | Jensen . |
| 4,354,562 | 10/1982 | Newman . |
| 4,512,428 | 4/1985 | Bullivant . |
| 4,532,810 | 8/1985 | Prinz et al. . |
| 4,738,235 | 4/1988 | Bullivant et al. . |

FOREIGN PATENT DOCUMENTS

| | | |
|---|---|---|
| 0091274 | 10/1983 | European Pat. Off. . |
| 2027914 | 2/1980 | United Kingdom . |
| 2076979 | 12/1981 | United Kingdom . |

*Primary Examiner*—George H. Miller, Jr.
*Attorney, Agent, or Firm*—Oliff & Berridge

[57] ABSTRACT

Two embodiments of a low profile weight sensor for a weight sensing system for monitoring article input and removal from article storage apparatus comprises a plate or I-shaped bar support member having first and second sections, an integrally formed linkage system for connecting the first and second sections such that the sections are substantially coplanar in an unloaded state, and are relatively displaceable with respect to each other in response to a weight load applied to one of the sections; and a magnetic transducer mounted on surfaces extending in the thickness direction of the plate/-bar member for producing an electrical output signal responsive to relative displacement of the first and second sections. The article input and removal monitoring system also comprises self calibrating apparatus comprising circuitry for measuring the stability of weight measurements obtained from the weight sensors and producing a limit value, circuitry responsive to the weight sensing circuitry for signalling an operator and automatically taking first and second test measurements to obtain a calibration weight value, and circuitry for comparing the calibration weight value with a predetermined multiple of the limit value and signalling an invalid calibration if the calibration weight value is less than the predetermined multiple of the limit value.

4 Claims, 14 Drawing Sheets

Fig. 6
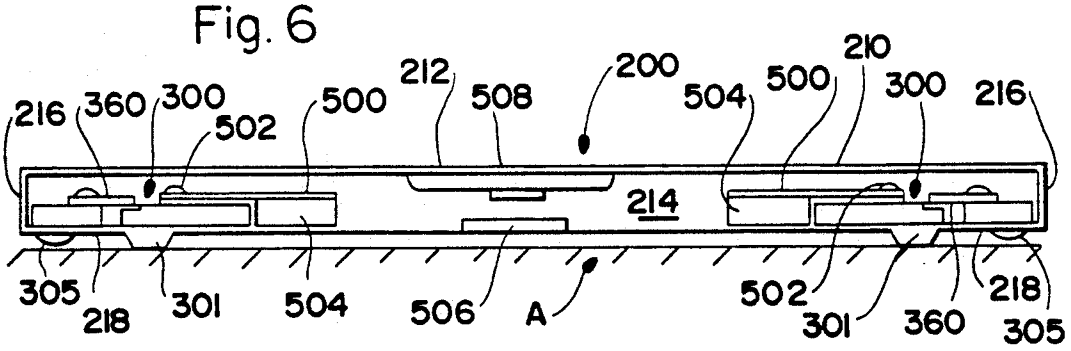
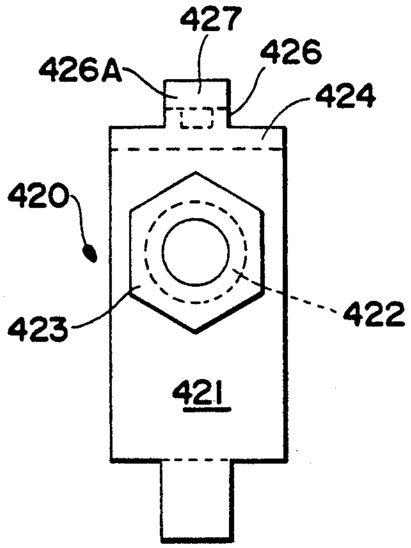
Fig. 12
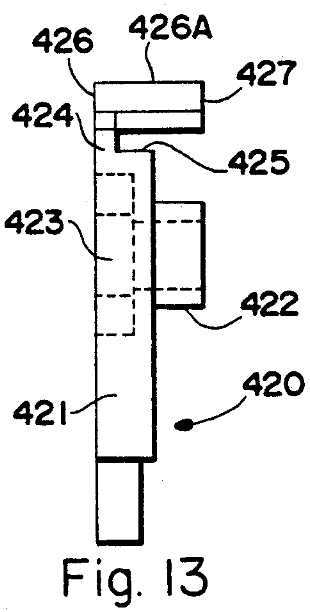
Fig. 13
Fig. 14
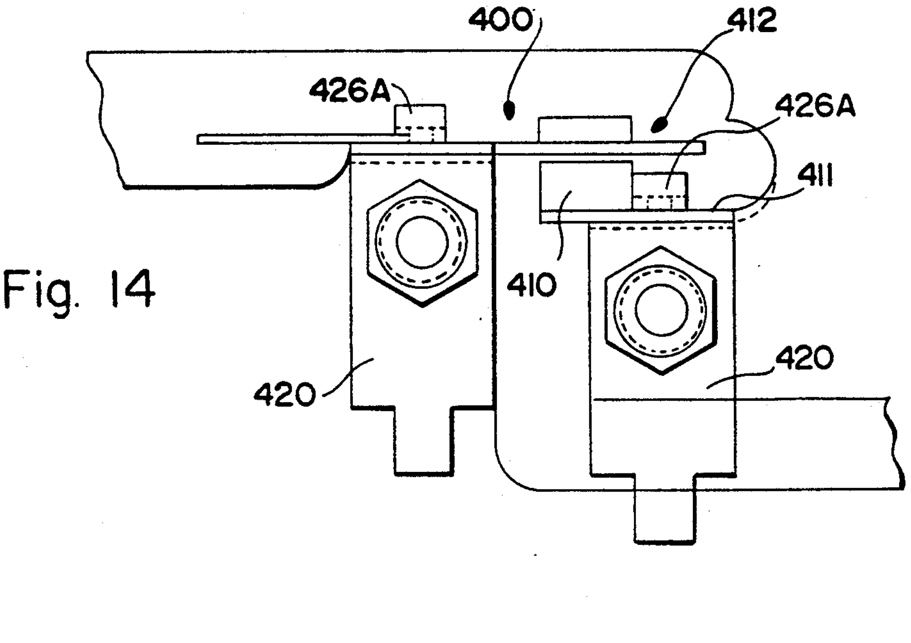

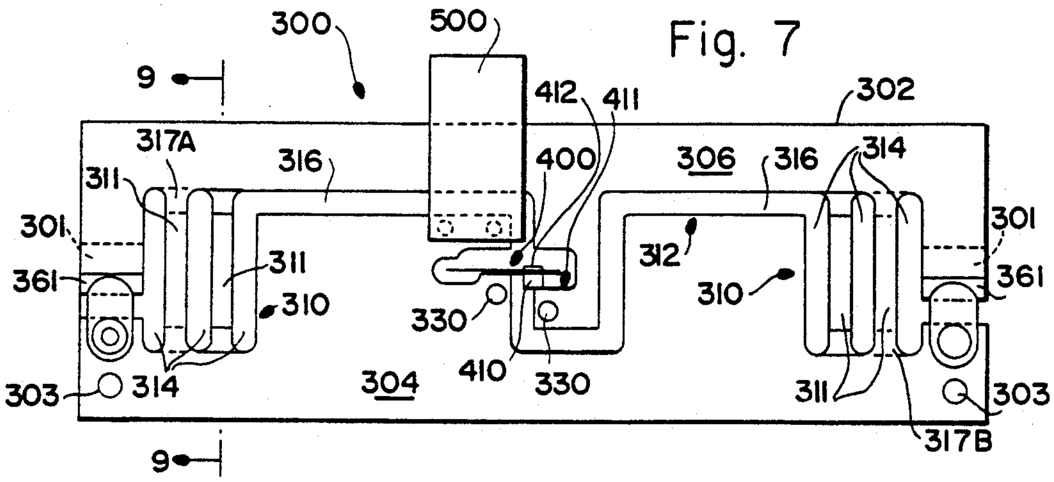
Fig. 7
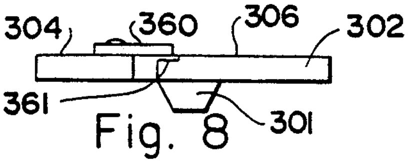
Fig. 8
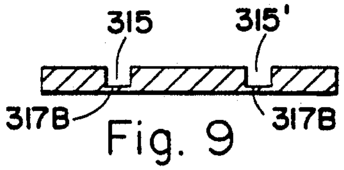
Fig. 9
Fig. 10
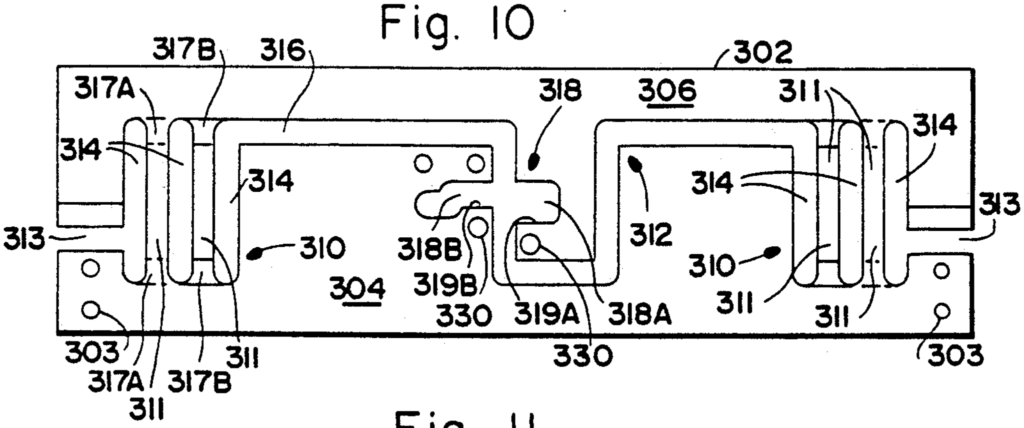
Fig. 11
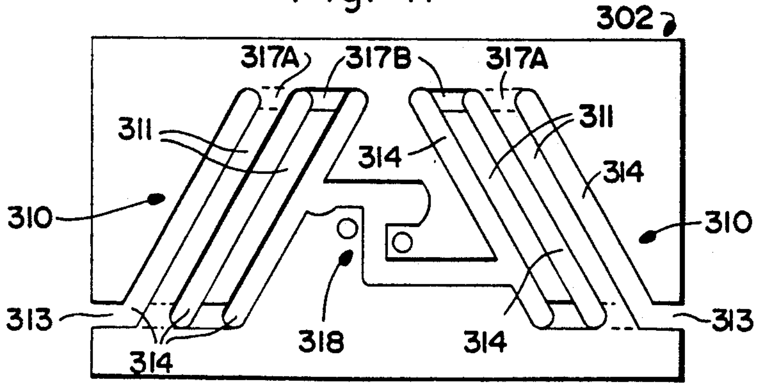

SELF-CALIBRATING APPARATUS FOR ARTICLE INPUT AND REMOVAL MONITORING SYSTEM

CROSS-REFERENCE TO RELATED APPLICATIONS

This is a division of Ser. No. 07/467,516 filed Jan. 18, 1990, now U.S. Pat. No. 5,000,274, which is a continuation-in-part of application Ser. No. 07/299,062, filed Jan. 19, 1989 now abandoned, which is a continuation-in-part of application Ser. No. 07/245,947, filed Sept. 19, 1988 (now U.S. Pat. No. 4,819,015), which is continuation of application Ser. No. 07/157,985, filed Feb. 19, 1988, which in turn is a continuation of application Ser. No. 06/874,159, filed June 13, 1986, now abandoned.

TECHNICAL FIELD

The invention pertains in general to systems and methods for monitoring the input and removal of articles from article storage systems, and in particular to anti-theft consumer product displays, and to weight sensors and calibration methods for such article monitoring systems.

BACKGROUND OF THE INVENTION

A fundamental requirement of product displays used in retail environment is that they present the product in an aesthetically pleasing and readily accessible manner in order to promote product sales. However, in order to minimize loss or revenue due to shoplifting, product displays should also provide some means of indicating when products have been removed from the display for the purpose of theft rather than for purchase.

Approaches to the problem of shoplifting from product displays include placing the product behind transparent barriers with apertures that are large enough for the human hand but too small to remove a product displayed in the rack. When a consumer chooses a product, he or she is required to request the aid of a salesperson to unlock the transparent barrier and allow removal of the product. The barrier may present an unacceptable aesthetic impression of the product which will result in lost sales. Also, requiring a customer to request assistance in choosing a product will also result in lost sales.

Often, transparent barriers are provided on product displays which allow stacked products to be removed one at a time from the bottom of the stack. The products are removable only through a slot or the like in the transparent barrier aligned with the bottom of the stack of products. Requiring products to be removed only one at a time clearly discourages multiple pro duct purchases.

Other approaches display products on a rack with the products being captured by a slidable retainer or the like. I the slidable retainer is moved without proper authorization, a electrical circuit is interrupted and an alarm is sounded. Once again, this type of display requires intervention of a sales person in order to deactivate the alarm system for legitimate product removal.

The improved product display rack which is the subject of the aforementioned copending application Ser. No. 07/245,94 (now U.S. Pat. No. 4,819,015) avoids the above-describe problems. The product rack invention of the '947 application is particularly adapted for implementation in large-size product racks which contain large numbers of the same product, such as for example free-standing cigarette carton display racks. How ever, a need remains for an anti-theft system suitable for small scale product racks such as counter-top product displays and the like. It is especially important, for example, that such a anti-theft system have a minimal height profile, and be otherwise physically configured so as not to detract from the attractiveness and utility of the product display. Other types of smallscale article storage systems, such as, for example, cash register cash drawers, have severe restrictions on the space that can be occupied by a system for monitoring input and removal or articles from the storage system.

It is also common for counter-top product displays, as well as other small-scale article storage systems, such as cash register cash drawers and the like, to hold a number of different products of varying sizes and weights. It is thus necessary for an anti-theft system, or an article input and removal monitoring system for such a product rack or article storage system to be able to detect input/removal of a variety of products with different characteristics.

In addition, small-scale product racks and other article storage systems come in a wide variety of sizes, configurations and capacities, and the same rack/storage system can be used for a wide range of products in many diverse environments. It is thus important that the anti-theft/monitoring system be compatible with, and readily adapted to many different applications and that the system be readily calibrated by the product rack/storage system user for the user's specific use.

Further, anti-theft/monitoring systems for small-scale product displays and other article storage systems should be inexpensive while still providing high resolution with short term repeatability. Such systems should also be modular in construction to permit economical fabrication in various sizes and shapes. Such systems should also be durable and protected against damage due to physical overloading.

SUMMARY OF THE INVENTION

The present invention is particularly suited to meet the above-described needs of small-scale anti-theft product racks, well as other small-scale article storage systems in which it desired to monitor input and removal of articles from the storage system. In accordance with one aspect of the present invention an article input and removal system employs a low profile platform scale having a "flat" weight sensor comprising plate apparatus having first and second sections; a flexible linkage for connecting the first and second sections such that the fir and second sections are substantially coplanar in an unload state, and are relatively displaceable with respect to each other in response to a weight load applied to one of the sections; a transducer mounted on the plate apparatus for producing electrical output signal responsive to relative displacement the first and second sections. Preferably, a single plate member constitutes the plate apparatus, and the first and second sections and the linkage are integral portions of the plate member.

In accordance with a further aspect of the invention, the linkage comprises a plurality of parallel link members formed the plate member and joined to the first and second sections relatively flexible joint portions. Advantageously, the fir and second sections and the link members are formed by slots the plate member.

In accordance with an additional aspect of the invention the transducer comprises a magnetic field generator fixedly secured to the first section and a magnetic field sensor secured to the second section proximate the magnetic field generator, and the slots include a centrally formed slot defining first and second spaced mounting surfaces on the first and second sections respectively, which mounting surfaces extend in the thickness direction of the plate member, and to which the magnetic field generator and magnetic field sensor are respectively secured.

In accordance with still another aspect of the invention bracket mounting guides are provided for positioning the magnetic field sensor in alignment with a longitudinal center line of the plate member and for positioning the magnetic field generator ar a predetermined location relative to the longitudinal center line of the plate member.

In accordance with a further aspect of the invention, low profile multiple weight sensor system comprises a plate having a plurality of weight sensing portions, each of which comprises first and second sections and a flexible linkage for connecting the first and second sections; with the second sections being connected together to a common framework. Preferably, the first and second sections are integral parts of the plate member and each of the second sections is joined to the common framework by a single, relatively narrow tongue section.

In accordance with a still further aspect of the present invention, a weight sensor having both a low and a narrow profile utilizes an I-shaped bar member in lieu of a plate member, with flexible linkages formed in the flange portions of the ba member.

In addition, an article input and removal monitoring system constructed in accordance with the present invention also employs a calibration system which comprises a weight sensor of producing an output signal corresponding to the weight of the article storage apparatus when loaded with articles to be input or removed from the article storage apparatus during use thereof apparatus for measuring the stability of weight measurements obtained from the weight sensor output signal and for producing first limit value indicative of the noise in the weight sensor output signal; test weight measurement apparatus responsive to the weight sensor for obtaining a first test measurement, for signaling an operator to remove a test article from the article storage apparatus, for obtaining a second test measurement during a predetermined time period following a signaling of the operator, and for comparing the first and second test measurements to obtain a calibration weight value; and apparatus for comparing the calibration weight value with a predetermined multiple of the first limit value and for producing a signal indicative of an invalid calibration if the calibration weight value is less than the first limit value.

When employed in an anti-theft product rack, it will also be appreciated that the present invention is fully compatible with and can utilize all of the anti-theft features of the invention of the aforementioned '947 application.

These and other features and advantages of the present invention are described in or will be apparent from the following detailed description of preferred embodiments.

BRIEF DESCRIPTION OF THE DRAWINGS

The preferred embodiments will be described with reference to the appended drawing, in which like elements have been designated with like reference numerals throughout the figures and in which:

FIG. 6 is a side elevation view, partially in cross section and partially diagrammatic, of a first embodiment of platform scale according to the present invention;

FIG. 7 is a plan view of a first embodiment of a weigh sensor according to the present invention used in the platform scale of FIG. 6, with certain features omitted for the sake o clarity;

FIG. 8 is an end elevation view of the weight sensor o FIG. 7;

FIG. 9 is a cross-sectional view of the weight sensor o FIG. 7 taken along the line 9—9;

FIG. 10 is a plan view of a portion of the weight sensor of FIG. 7;

FIG. 11 is a plan view of a portion of a second embodiment of a weight sensor according to the present invention;

FIGS. 12 and 13 are front and side elevation views respectively, of a guide bracket for use in weight sensor according to the, present invention;

FIG. 14 is a plan view of a portion of the weight sensor of FIG. 7 showing the guide bracket of FIGS. 12 and 13 mounted thereon;

DETAILED DESCRIPTION OF THE PREFERRED EMBODIMENTS

Since the present invention is closely related to the invention of the aforementioned '947 application, and is adapted to use the same theft detection and product removal alarm and acknowledgment routines, a consumer product rack according to the '947 application will first be described.

Figure 1:
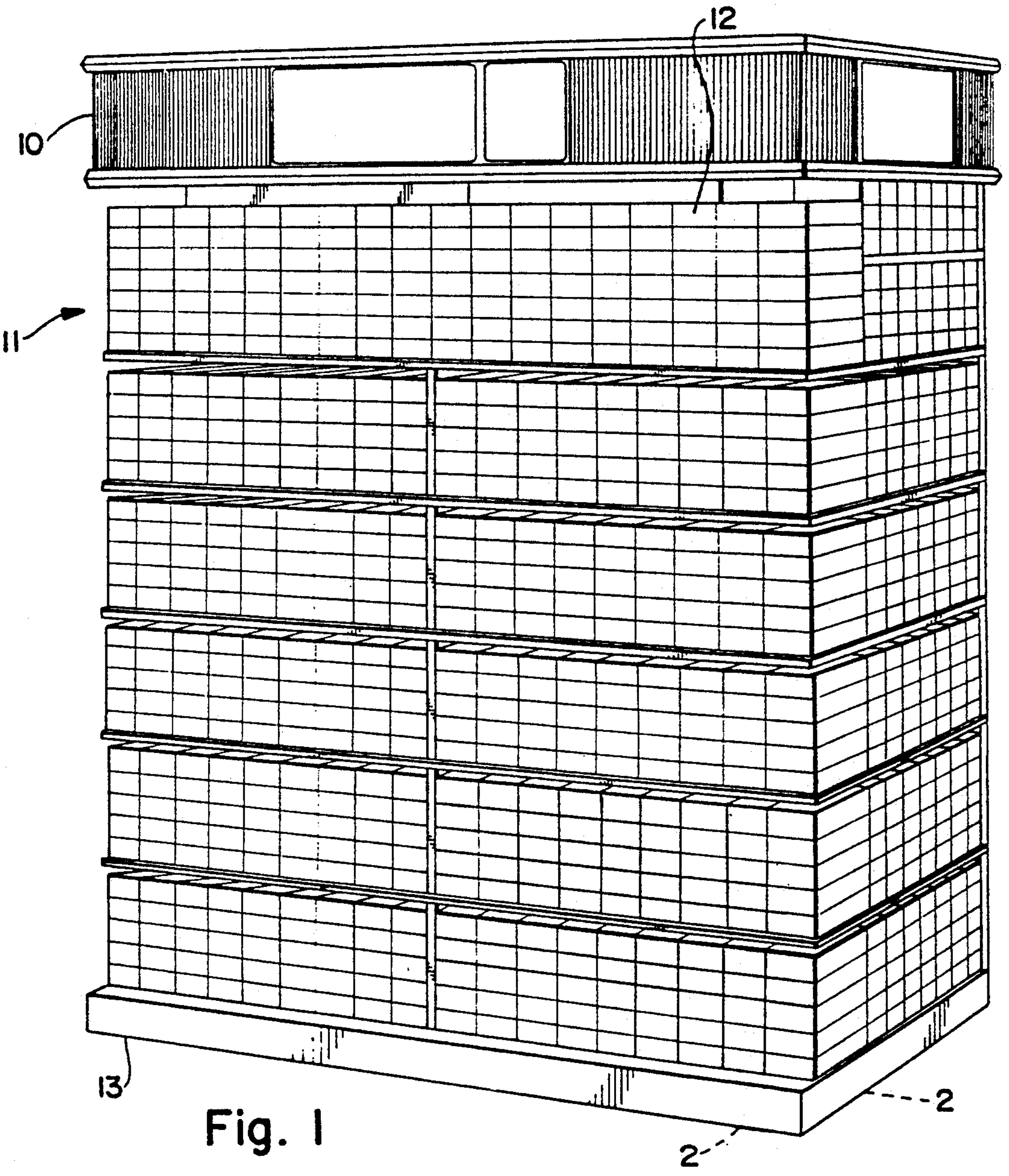
FIG. 1 is an isometric view of one embodiment of a consumer product rack according to the invention of the aforementioned '947 application.

Referring to FIG. 1, a consumer product rack 10 according to the '947 application includes a number of individual compartments 11, each compartment holding a plurality of consumer pro duct units 12, such as, for example, cartons of cigarettes While rack 10 of the FIG.

Figure 2:
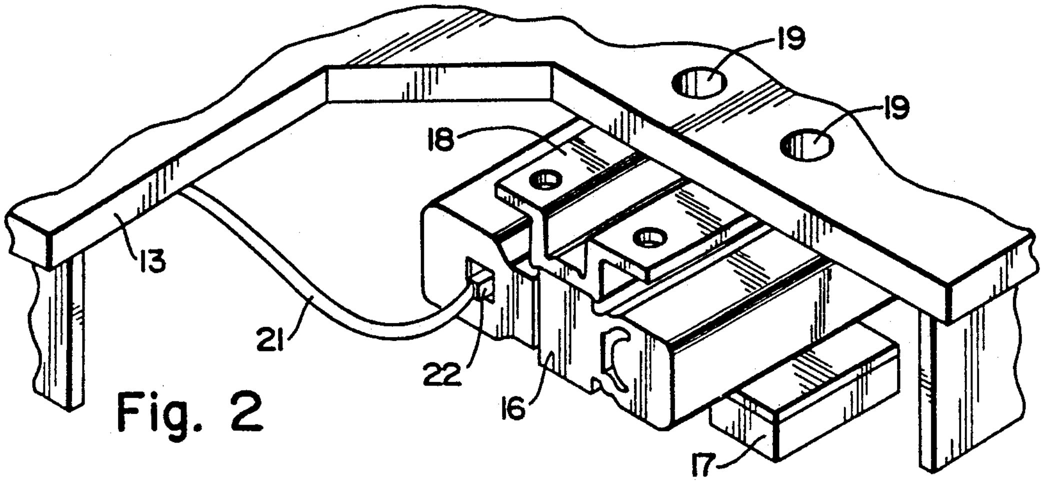
FIG. 2 is a partial sectional view of the base of the rack shown in FIG. 1, showing the mechanical details of a weigh sensor used in the FIG. 1 embodiment.

1 embodiment is a display rack intended for placement in a retail establishment, it will be understood the '947 application invention is equally applicable other product racks, such as warehouse plates, and the like Rack 10 rests on base 13 which is supported by a plurality feet, as shown in detail in FIG. 2.

Referring to FIG. 2, which is a sectional view of a portion of base 13, the detail of the placement of weight transducers used in rack 10 is disclosed. Each transducer 16 is placed between a foot 17 and bracket 18. Bracket 18, in turn is connected to base 13 by appropriate attachment means 19 such a screws or rivets.

In practice, a plurality of weight transducers 16 ar placed at a plurality of points beneath base 13 so that the entire weight of rack 10 (FIG. 1) can be accurately sensed by the plurality of weight transducers. Each weight transducer is connected to the weight signal processing circuitry shown in detail in FIG. 3 by conductor 21 and connector 22.

Weight transducers 16 are preferably of the highly accurate vibrating wire-type which produce a voltage signal having a frequency which varies in proportion to the weigh sensed by the transducer.

Figure 3:
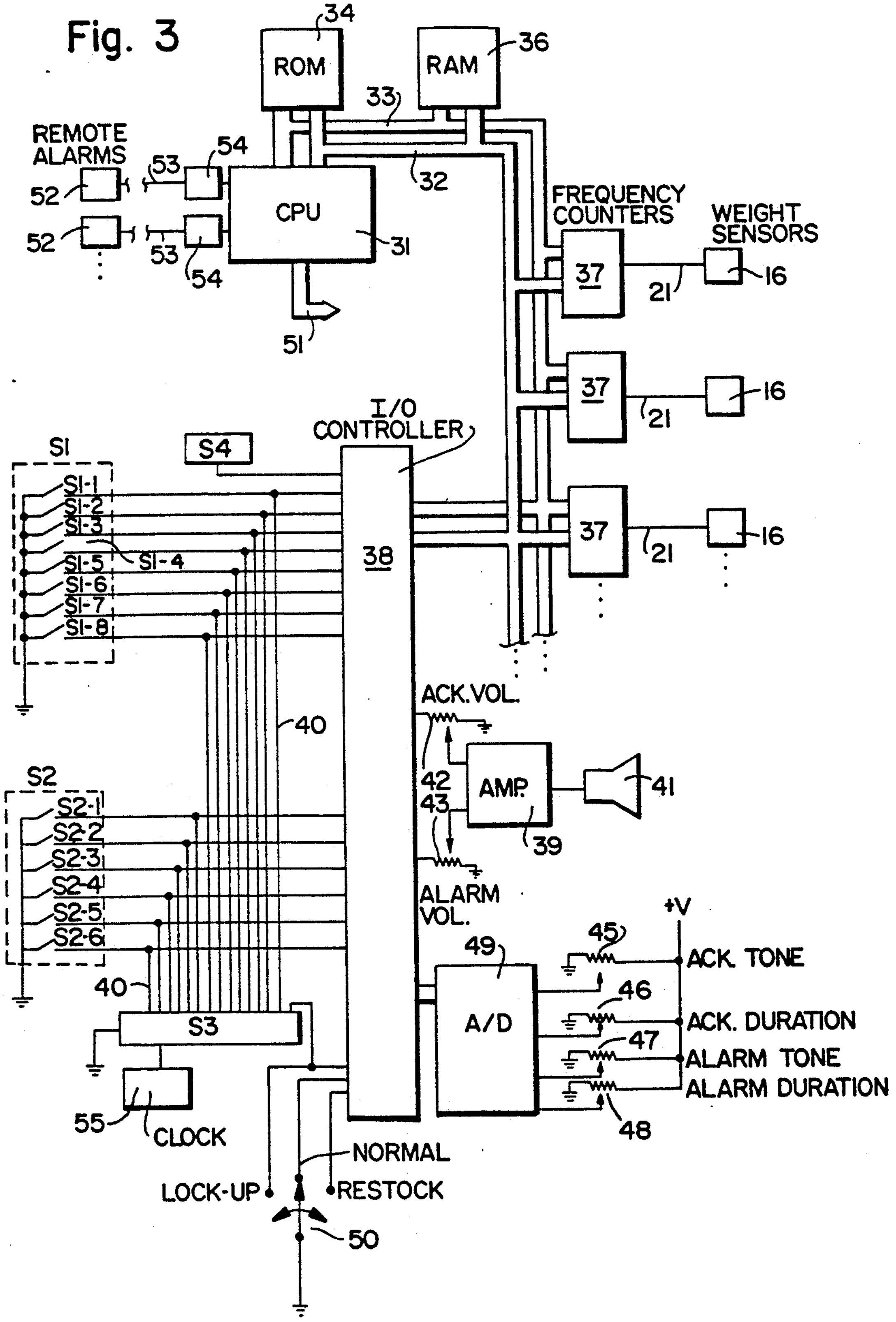
FIG. 3 is an electrical schematic block diagram of the control system employed in the FIG. 1 embodiment.

Referring to FIG. 3, the hardware embodiment of the control system for rack 10 is shown. A central processing unit (CPU) 31 is used to perform the calculations and to control the various input/output operations. Processor 31 can be, for example, a type 8031 microcomputer available from Intel Corporation.

Connected to processor 31 are data bus 32 and address bu 33. Buses 32 and 33 allow processor 31 to communicate with the various other hardware components of the control system. Processor 31 communicates with read only memory (ROM) 34 and random access memory (RAM) 36. ROM 34 is used to store the control program shown in FIGS. 4A–4D and 5, while RAM 36 is used as scratch pad memory. ROM 34 can also store the synthesized voice of the acknowledge salutation. It should be noted that both ROM 34 and RAM 36 may be located within processor 31, such as, of example, in a type 8051 microcomputer available from Intel Corporation.

The individual weight sensors 16 are connected by conductors 21 to respective frequency counters 37 which, in turn, are connected to data bus 32 and address bus 33. The individual frequency counters 37 count the frequency of the voltage produced by respective weight sensors 16, and produce a binary word indicative of sensed weight which is placed on data bus 32 when interrogated by processor 31 via address bus 33. A typical accumulation period for counters 37 is 0.25 seconds. At the end of a particular accumulation period, counters 37 are reset and a new count is begun. Although FIG. 3 shows only three sets of frequency counters and weight sensors, any number of sensors and counters can be used. Frequency counters 37 can be, for example, type 8253 frequency counters manufactured by Intel Corporation.

Also connected to data bus 32 and address bus 33 is input/output controller 38 which can be, for example, a type 8155 controller available from Intel Corporation. Controller 38 is connected to ganged switches S1 and S2 which allow a user of the system to program the system for a specific application. Details of this programmability will be discussed below.

Also connected to controller 38 is amplifier 39 which powers alarm speaker 41. Speaker 41 produces both a local acknowledge tone and a local alarm. Alternatively, a synthesized voice signal may be stored in ROM 34 and may be played instead of, or in addition to, the acknowledge tone. The volume of the acknowledge tone or voice is controlled by potentiometer 42, and the volume of the local alarm signal is controlled by potentiometer 43.

The tone and duration of the acknowledge signal and the local alarm are adjustable by use of potentiometers 45–48. One end of each of potentiometers 45–48 is connected to a voltage source +V, and the other ends are grounded. The wiper of each potentiometer is connected to analog-to-digital converter 4 which, in turn, is connected to controller 38. Analog-to-digital converter 49 can be, for example, a type ADC0844 converter manufactured by National Semiconductor Corporation.

Three position key lock switch 50 is also connected t controller 38. When switch 50 is in a first position, the display rack is in a normal mode with all features active. In second position, key lock switch 50 disables the theft prevention features of the present invention to allow restocking. Switch 5 can also be positioned in a third position which places the rack in a night lock-up mode. In the night lock-up mode, any disturbance of the rack will cause an alarm.

Processor 31 is also connected to data output bus 5 which can be used to drive a display or printer (not shown) for the purpose of monitoring the weight of the system or monitoring the disturbance activity or purchase activity of the system Processor 31 is also connectable to remote alarms 52 through individual links 53. Alarms 52 can be located far from the product display rack for remote monitoring of the system. I desired, the local alarm can be reduced to zero volume and the product display rack can be monitored using only remote alarm 52. Once again, it will be understood that while only two alarm 52 are shown in FIG. 3, this disclosure is offered by way o example rather than limitation and any number of remote alarm may be used.

Links 53 are preferably wire or radio link. A preferred radio link may use, for example, a type D-24A transmitter 54 an a type D-67 receiver manufactured by Linear Electronics o Carlsbad, California. Since this preferred transmitter 54 is powered by an internal battery and sends a signal when its control contact is open, this allows an alarm signal to be sent t remote alarms 52 when the display rack becomes unpowered or if the connection between processor 31 and links 53 is severed Links 53 can also be used to actuate a video camera which will record activity in the vicinity of the protected rack.

If links 53 are wire, elements 54 in FIG. 3 can be appropriate line drivers.

Switches S1, S2 are used by a system operator to manually program various system parameters as described in detail below The manual settings of switches S1 and S2 may be overriden by contacts within switch S3. Switch S3 is controlled by real-tim clock 55. Clock 55, in combination with switch 53, allows one or more of the various parameters to be automatically programmable dependent upon time of day. Clock 55 and switch S3 can also be used to automatically place key-lock switch 50 in the lock-up mode, for example, when a store is closed.

Referring to FIGS. 4A–4D, the individual processing step of the present invention will be described. After the routine is started, the states of switches S1 and S2 are interrogated an parameters K0, K1, K2, K3 and K5 are set according to the following Tables.

TABLE I

| K0: Weight Limit For Instability | |
|---|---|
| S1-7 | Limit (100ths of Units) |
| closed | 30 |
| open | 40 |

TABLE II

| | K1: Instantaneous Removal Limit | | |
|---|---|---|---|
| S1-1 | S1-2 | S1-3 | No. of Product Units |
| closed | closed | closed | 1 |
| open | closed | closed | 2 |
| closed | open | closed | 3 |
| open | open | closed | 4 |
| closed | closed | open | 5 |
| open | closed | open | 6 |
| closed | open | open | 7 |
| open | open | open | 8 |

TABLE III

| K2: Unstable Episode Limit | |
|---|---|
| S1-8 | Limit |
| closed | 10 |
| open | 20 |

TABLE IV

| | K3: Periodic Removal Limit | | |
|---|---|---|---|
| S1-4 | S1-5 | S1-6 | No. of Product Units |
| closed | closed | closed | 3 |
| open | closed | closed | 4 |
| closed | open | closed | 5 |
| open | open | closed | 6 |
| closed | closed | open | 7 |
| open | closed | open | 8 |
| closed | open | open | 9 |
| open | open | open | 10 |

TABLE V

| | K5: Time Period | | |
|---|---|---|---|
| S1-4 | S2-5 | S3-6 | Time (min.) |
| closed | closed | closed | 1 |
| open | closed | closed | 2 |
| closed | open | closed | 3 |
| open | open | closed | 4 |
| closed | closed | open | 5 |
| open | closed | open | 6 |
| closed | open | open | 7 |
| open | open | open | 8 |

In the present embodiment, parameter K4, which is the periodic unstable episode limit is set equal to 5. However, this limit could also be programmable with the addition of additional switches.

The remaining switches (1-3 of S2) are used to designate the number of weight transducers on a particular display rack This allows the same theft detection hardware to be applied to various sizes of racks using various numbers of weight transducers. Also, it allows the system to detect if a weight transducer has been disconnected. The number of valid transducers is set according to the following Table.

TABLE VI

| | Valid Transducers | | |
|---|---|---|---|
| S2-1 | S2-2 | S2-3 | Valid Transducers |
| closed | closed | closed | tone test |
| open | closed | closed | 1 |
| closed | open | closed | 1, 2 |
| open | open | closed | 1, 2, 3 |
| closed | closed | open | 1, 2, 3, 4 |
| open | closed | open | 1, 2, 3, 4, 5 |
| closed | open | open | 1, 2, 3, 4, 5, 6 |
| open | open | open | invalid setting |

When switches S2-1, S2-2 and S2-3 are all closed, the local alarm or voice is turned on, thereby allowing the tone and volume to be set as described earlier. When switches S2-1, S2-2 and S2-3 are all open, this state is ignored as an invalid setting. Therefore, according to the preferred embodiment, at least one and up to six weight transducers may be used. Once again this should not be considered a limitation of the '947 application invention. Additional transducers can be obviously accommodated by adding additional switches.

After the parameters are set by interrogation of switches S1 and S2 in block 56, control is transferred to block 57, where the first weight reading, WTRDGl, is taken. The weight is determined by interrogating the individual weight sensors 16 via frequency counters 37 (both shown in FIG. 3), and by summing the individual sensed weights. In this manner, the entire weight o the display rack is sensed. The units of variable WTRDGl are in 100ths of product units. Therefore the actual weight sensed by sensors 16 must be multiplied by a predetermined factor in order to convert the actual sensed weight into a weight in 100ths of product units. If, when taking weight reading WTGRDGl, the system detects weight signals are being produced by less than the number of transducers set by switches S2-1, S2-2 and S2-3 according to Table VI, an alarm is sounded.

Control is then transferred to block 58, where variable WTRDG2, WTRDG3 and PREWT are all set to WTRDGl.

The program then enters the main loop of the routine beginning with block 59, where, with operation identical to that of block 57, the weight WTRDGl is again sensed, and it is determined if the number of transducers is less than that indicated by switches S2-1, S2-2 and S2-3 according to Table VI Control is then transferred to block 61, where cycle counter CYCLCNT is incremented by 1 and counter OLDCYCL is set equal to counter CYCLCNT less K5.

Control is then transferred to motion detection decision blocks 62-64. In these decision blocks, the three stored weigh readings WTRDGl, corresponding to the present weight, WTRDG2 corresponding to the last sensed weight, and WTRDG3 corresponding to the penultimate sensed weight, are each subtracted and the differences are compared with parameter K0. If the difference between any two of the sensed weights is greater than parameter K0, flag MOTFLAGI is set equal to "1" in block 66. Otherwise, flag MOTFLAGl is set equal to "0" in block 57 Control is then transferred to decision block 58, where the state of MOTFLAGl is detected. If flag MOTFLAGl was set in block 66 counter MOTCNT is incremented by 1 in block 69. Otherwise counter MOTCNT is set to 0 in block 71. Counter MOTCNT keeps track of the number of consecutive cycles wherein motion is detected.

The value of counter MOTCNT is compared with parameter K2 in decision block 72. If counter MOTCNT is greater than parameter K2, indicating that the number of consecutive unstable episodes is greater than the desired limit, control is transferred to block 73, where variable ALARM is set equal to "2" counter MOTCNT is reset in block 74 and the alarm is sounded in block 76 (processing steps described in detail with reference to FIG. 5). This ends the motion detection portion of the routine.

Control is then transferred to decision block 77, where detection of the number of product units removed is begun. In block 78, variable PREWT is set equal to the last sensed weight WTRDG2, if MOTFLAG1 is equal to "1" and if flag MOTFLAG2 is equal to "0" as determined in decision block 77. In other words, decision block 77 determines if motion is detected during the present cycle when none was detected during the previous cycle.

Control is then transferred to decision block 79, where it is determined if no motion was detected during the present cycle, but that motion was detected during the previous cycle. This is accomplished in decision block 79, which interrogates flags MOTFLAG 1 and MOTFLAG2. If true, control is transferred t block 81 where the integer number of product units removed is determined by the rounding formula shown. Using this formula weights less than 0.49 units are rounded down, weights between 0.50 and 1.49 units are rounded to 1, and so forth. Control is then transferred to decision block 82, where it is determined if any product units were removed. If so, the local acknowledge tone is sounded, or the stored synthesized voice is played back in block 83, and control is transferred to block 84 to determine if the number of product units removed is greater than parameter K1. In other words, block 84 determines if the detected number of units removed from the rack is greater than the instantaneous removal limit. If so, control is transferred to block 86, where variable ALARM is set equal to "1" and the alarm is sounded in block 87. This ends the instantaneous removal detection portion of the routine.

Control is then transferred to block 88, where the routine for determining the number of unstable episodes occurring during time period K5 is determined. In block 88, counter N is set equal to "O" and control is transferred to a loop beginning with block 89, where counter N is incremented.

In decision block 91, all entries in motion vector MOTPER(N) are discarded if the entries are greater than counter OLDCYCL. Motion vector MOTPER(N) is a time stamp vector in which the individual entries record the cycle number when motion wa detected when that motion was determined not to be a removal of an integer number of product units.

By this means, only time stamps less than K5 old are retained in vector MOTPER(N). Counter N is incremented in block 93 and the checking loop is traversed until N equals 10. It should be emphasized that although only 10 time stamps are retained in vector MOTPER(N), this is once again by way of example only and not by way of limitation.

Control is then transferred to decision block 94, where if there has been no motion detected during the present cycle and if there was motion detected during the past cycle, and if the number of product units removed is less than 1, control is transferred to block 95, where counter N is set equal to "0". In the loop beginning with block 96, counter N is incremented and consecutive entries of vector MOTPER(N) are interrogated an determined if equal to 0 in block 97. When the first 0 element is detected, control is transferred to block 98, where the individual element of MOTPER(N) is set equal to the present cycle CYCLCNT, in block 98, thereby recording a time stamp of the detected motion. The loop including block 97 is not exited unless a zero element is found in vector MOTPER(N), or unless the end of the vector is detected in decision block 99.

Control is then transferred to block 101, where counter Q and N are both set equal to "0" and another checking loop is entered. In this loop, counter N is incremented in block 102 and individual entries of vector MOTPER(N) are interrogated by decision block 103. If an entry is greater than 0, counter Q is incremented by 1- in block 104. The loop is retraced until the end of vector MOTPER(N) is detected in decision block 106. Thus, counter Q is set equal to the number of non-zero entries in motion vector MOTPER(N).

Control is then transferred to decision block 107, where it is determined if counter Q is greater than parameter K4. If so, control is transferred to block 108, where variable ALARM is set equal to "4" and the alarm is sounded in block 109. In other words, the alarm is sounded if counter Q indicates that there has been a number of unstable episodes greater than parameter K4 during a period set by parameter K5. This ends the periodic unstable episode detection portion of the routine.

Control is then transferred to block 111, where counter N is set equal to 0. Block 111 begins a routine which detects the number of product units removed during a time period set by parameter K5.

Figure 4A:
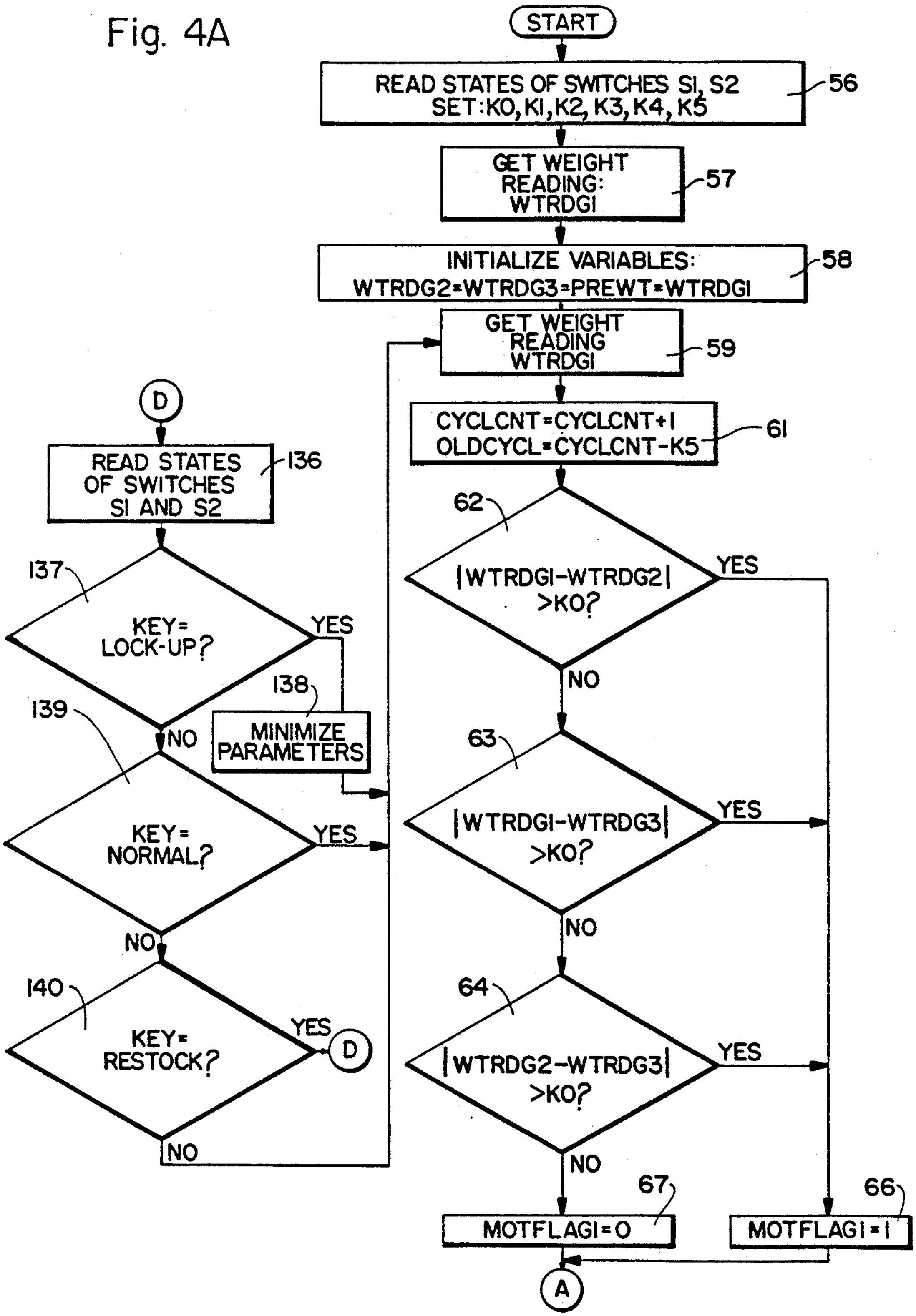
FIGS. 4A-4D are a flow chart detailing the computational steps of the theft detection routine of the FIG. 1 embodiment.
Figure 4B:
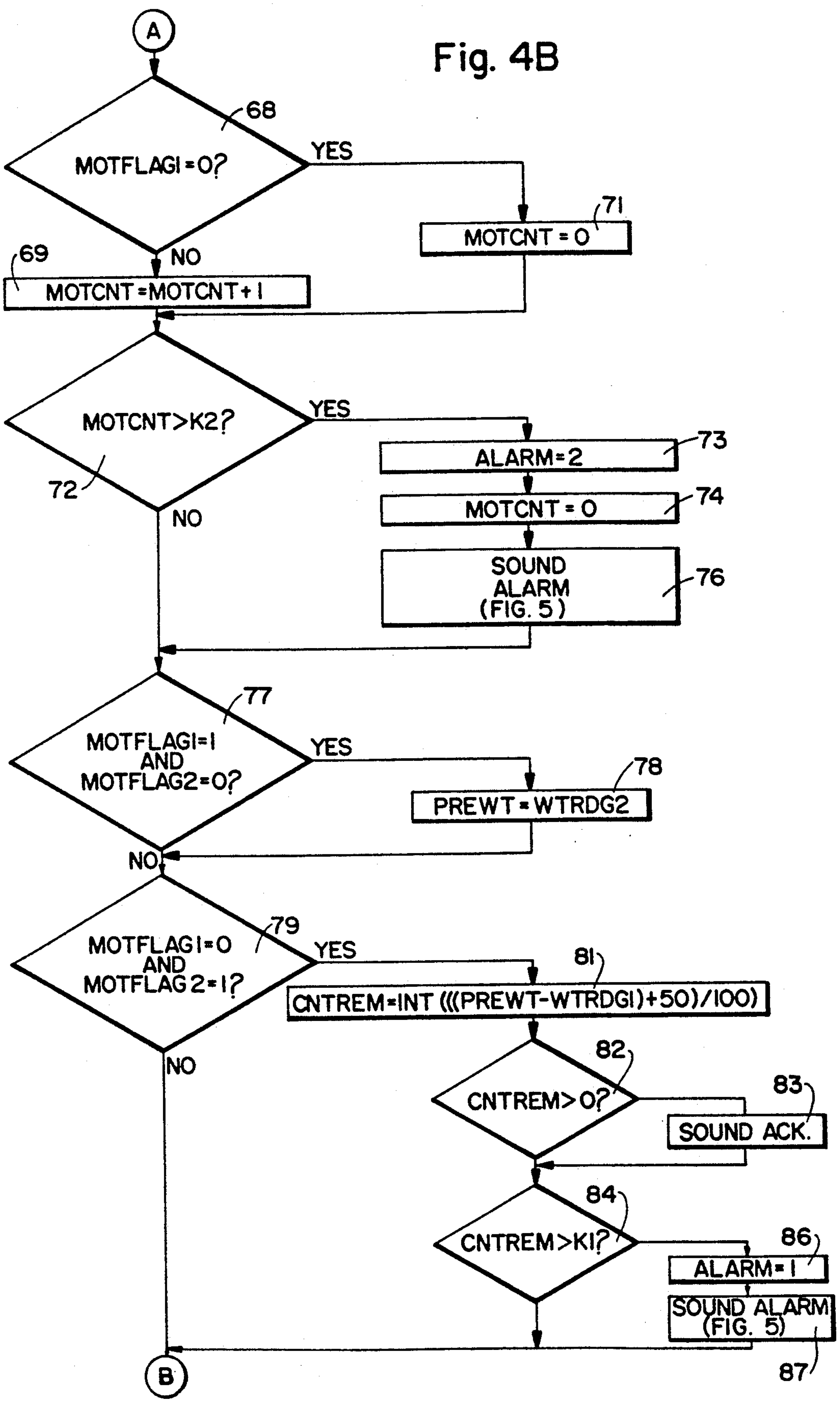
Figure 4C:
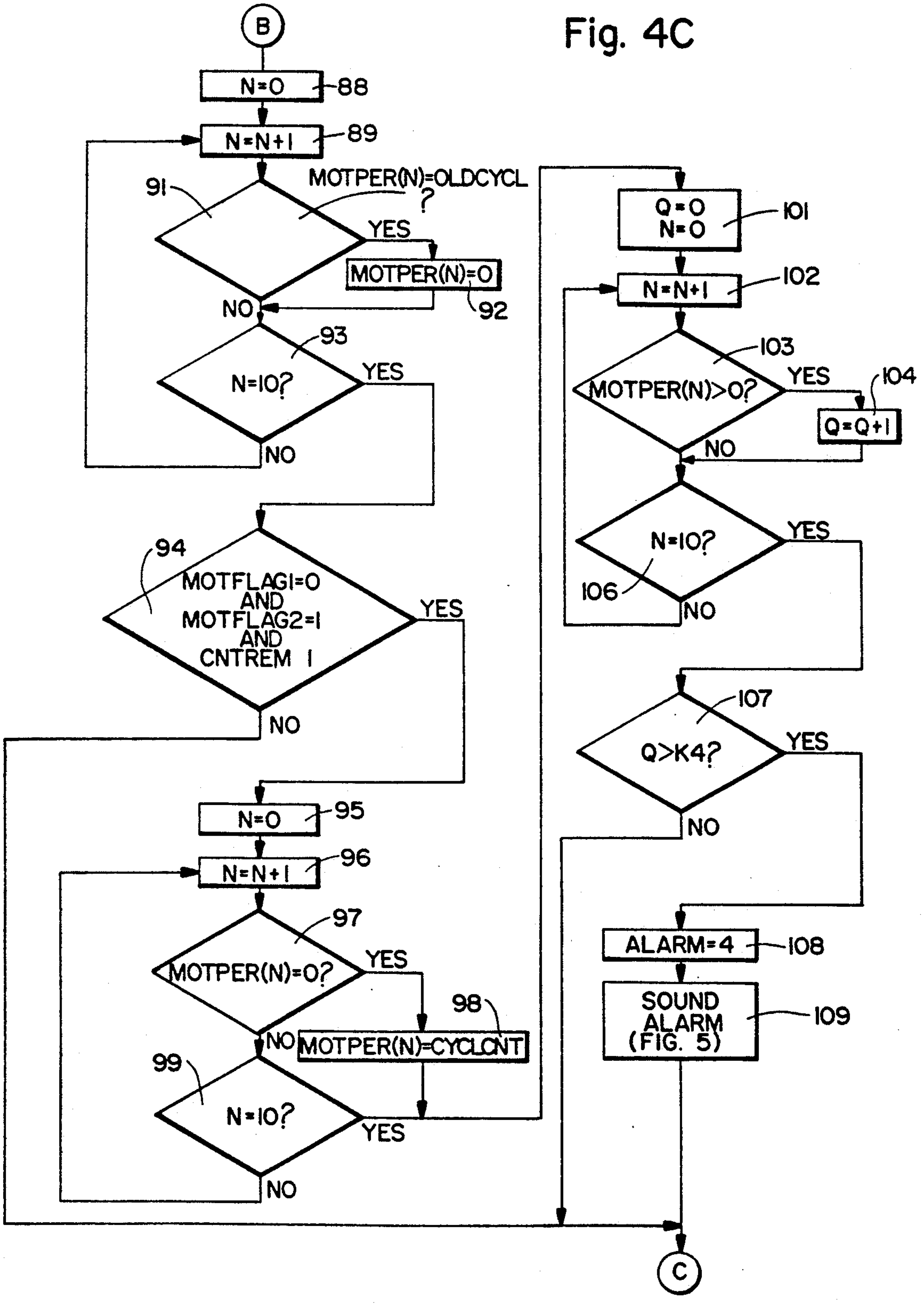
Figure 4D:
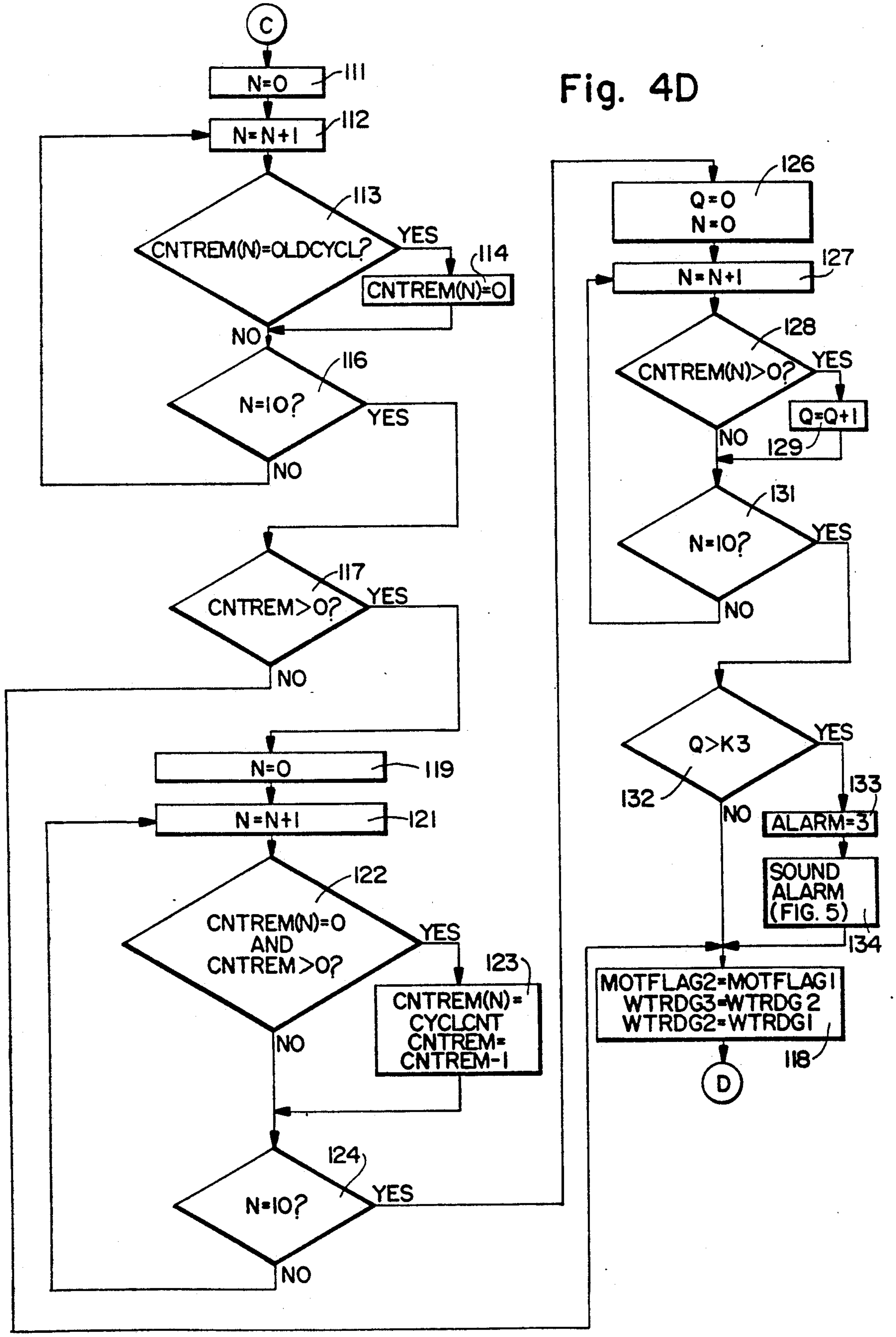

In block 112, counter N is incremented and a loop is started in which the individual entries of counter vector CNTREM(N) that are greater than counter OLDCYCL, as determined by decision block 113, are set equal to 0 in block 114. Count vector CNTREM(N), similar in format to motion vector MOTPER(N) is a time stamp vector in which the individual entries record the cycle number when each product unit was removed. The loop is retraced until all entries of vector CNTREM(N) have been interrogated as determined by decision block 116. After this loop, all entries of counter vector CNTREM(N) will be set to 0 if the counts are equal to counter OLDCYCL (i.e., older than time period K5). In decision block 117 it is determined if any product units have been removed by interrogation of counter CNTREM. If not, no further action is taken and control is transferred to block 118 (FIG. 4D). If true, control is transferred to block 119, where counter N is set equal to "0" and a loop is begun with block 121 where counter N is incremented.

In the loop beginning with block 121, count vector CNTREM(N) is interrogated for 0 entries in block 122, and counter CNTREM is compared with "0". If a zero entry is detected and if CNTREM is greater than zero, control is transferred to block 123 where the vector entry detected as 0 in block 122 is set equal to counter CYCLCNT, and counter CNTREM is decremented by 1. The interrogation loop is continued until decision block 12 determines that the last entry in count vector CNTREM(N) has been interrogated. As a result of this loop, time stamps equal to the present cycle count are entered into vector CNTREM(N) for each product unit removed. It should be noted that if more than one product unit is detected as being removed during a single cycle, several of the entries in count vector CNTREM(N) will have the same value.

Control is then transferred to block 126, where counter Q and N are both reset. In block 127, counter N is then incremented and a loop is begun wherein the individual entries of counter vector CNTREM(N) are interrogated in decision block 128. For each non-zero entry in vector CNTREM(N), counter Q is incremented by 1 in block 129. The loop is retraced until decision block 131 determines that each element of vector CNTREM(N) has been interrogated. As a result of this loop, counter Q indicates the number of non-zero entries in count vector CNTREM(N).

In decision block 132, counter Q is compared with parameter K3 to determine if the periodic unit removal limit has been exceeded. If so, variable ALARM is set equal to "3" in block 13 and the alarm is sounded in block 134. Control is then transferred to block 118, where the flag MOTFLAG2 is updated, as are weight readings WTRDG3 and WTRDG2. Control is then transferred back to block 136 (FIG. 4A), where the loop is once again begun.

Referring back to FIG. 4A, in block 136, which operates identically to block 56, the states of switches S1 and S2 are again sensed. This is done in order to detect any changes in the states of switches 51 or 52 under action of switch 53 (FIG. 3).

Next decision blocks 137, 139 and 140 are used to detect the position of key-lock switch 50 (FIG. 3). If key lock switch 50 is in the lock-up mode (or if switch 53 has placed key-lock switch 50 in the lock-up mode), block 137 directs control to block 138, where appropriate parameters are minimized in order t place the rack at its highest theft prevention sensitivity Control is then transferred to block 59, where the entire loop i retraced.

If block 139 does not detect lock-up, control is transferred to block 138, where normal mode is detected. If key lock switch 50 is in the normal mode position, control is transferred to block 59, and the loop is retraced.

If block 139 decides key lock switch 50 is not in the normal mode, control is transferred to decision block 140, where, if key lock switch 50 is in the restock mode, block 136 is again reentered without retracing the main loop. Otherwise, the main loop is retraced by entering block 59.

Figure 5:
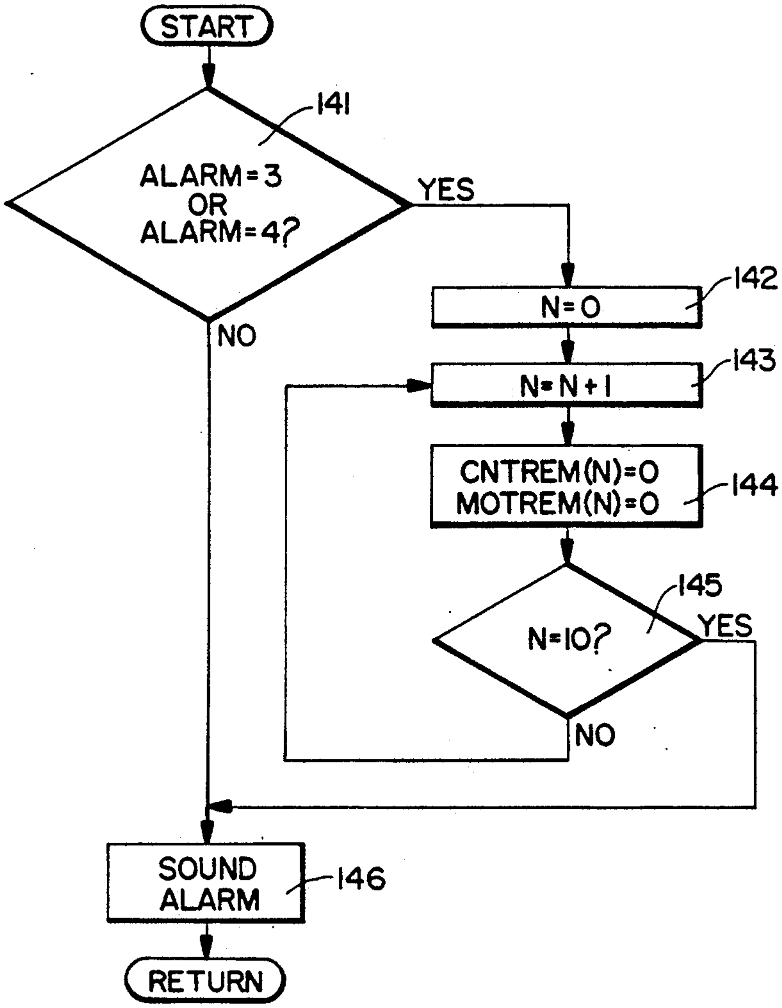
FIG. 5 is a flow chart of the computational steps of the alarm routine of the FIG. 1 embodiment.

Referring now to FIG. 5, the alarm routine will be described. In block 141, it is determined if variable ALARM is equal to "3" or "4". If not, control is transferred immediately to block 146. If so, counter N is reset in block 142, and a loop comprising blocks 143-145 is traversed a sufficient number of times to reset all entries of vectors CNTREM(N) and MOTPER(N). Then the alarm is sounded in block 146.

In summary, switches S2-1, S2-2 and S2-3 are positioned by the user of the system as shown in Table VI to accommodate the number of weight transducers in the rack in use. Parameter K1, the instantaneous removal limit, is set by positioning switches Sl-1, Sl-2 and Sl-3 as shown in Table II, and is variable from 1 to 8 product units.

Switches Sl-4, Sl-5 and Sl-6 are used to set the number of product units which must be removed over a time period to cause an alarm. This is called the periodic removal limit, K3 and is adjustable from 3 to 10 product units as shown in Table IV. The time period, K5, for the periodic removal limit is set by positioning switches S2-4, S2-5 and S2-6, as shown in Table V In addition, an alarm will sound if the display rack is disturbed continuously for a number of cycles settable by switch S1-8 (parameter K2) as shown in Table III. Finally, rack tampering or "swapping" of other merchandise for product units contained in the rack is detected if five unstable episodes (parameter K4 occur within the time period set by parameter K5.

The product rack will acknowledge removal of product units (when not in excess of an alarm limit) by an adjustable local tone or synthesized voice which can be set to zero volume. The separately adjustable local alarm tone can also be set to zero volume if local alarm is not desired. The alarm signal can be transmitted to a remote receiver, over wire or radio link, which will sound an alarm at a remote location. The local tones are both adjustable in volume, tone and duration.

A principal factor in determining how restrictive the various programmable alarm criteria for periodic removal should be is the extent to which legitimate purchases cause false alarms. This would of course occur during peak traffic hours. The following is a table displaying the results of a compute simulation which was based on the following assumptions:

1. During peak traffic hours, ten customers remove on product unit and five customers remove two product units of total sales of 20 product units during a peak hour.
2. The purchases occur at random times.
3. The predicted false alarm rate is the number of false alarms which would occur during 200 such peak hours.

TABLE VII

| Predicted False Alarms Per 200 Peak Hours | | | | | | | | |
|---|---|---|---|---|---|---|---|---|
| Alarm Limit | Time Period K5 | | | | | | | |
| K1 | 1 | 2 | 3 | 4 | 5 | 6 | 7 | 8 |
| 3 | 5 | 13 | 17 | | | | | |
| 4 | 5 | 12 | 17 | 29 | | | | |
| 5 | 1 | 1 | 1 | 6 | 8 | 10 | 12 | 16 |
| 6 | 1 | 1 | 3 | 5 | 8 | 10 | 12 | 16 |
| 7 | 0 | 0 | 0 | 0 | 2 | 4 | 5 | 6 |
| 8 | 0 | 0 | 0 | 0 | 2 | 4 | 5 | 6 |
| 9 | 0 | 0 | 0 | 0 | 1 | 2 | 3 | 3 |
| 10 | 0 | 0 | 0 | 0 | 1 | 2 | 3 | 3 |

It should be noted that odd numbered settings for the product unit alarm limit permit more restrictive settings without significantly higher incidence of false alarms. When time period and alarm limit settings are restricted to the lowest values which do not cause intolerable false alarm activity, the maximum protection against shoplifting is afforded. While theft of very few product units over an extended period of time may go undetected because this mimics plausible normal activity, the monetary loss of this type of theft is minimal.

Referring to FIG. 6, one preferred embodiment of an article input and removal monitoring system constructed in accordance with the present invention comprises a platform scale 200 which serves as the supporting base for a conventional product display or other article storage system (not shown). Platform 200 should have a gross capacity of 5 to 50 pounds and a surface area of one to four square feet in order to accommodate typical counter-top product displays. The overall platform height above the counter or other supporting surface A preferably should be no more than approximately 0.7 inches. It will be appreciated, though, that the present invention is not limited with respect to the capacity and size of scale 200, and that different load capacities and scale dimensions can be used as appropriate for a particular application.

As shown, scale 200 advantageously comprises an inverted sheet metal tray platform 210 having a top display mounting surface 212, downwardly depending sides 214 and ends 216, and inwardly projecting substantially horizontal flanges 218 extending from the respective ends 216. Two identical weight sensors 300 are respectively attached to flanges 218. Each weight sensor 300 is provided with a support foot 301 at each end for supporting platform 210 on support surface A so that the lower edges or platform 210 are spaced from support surface A, as shown. Sensors 300 are long enough that the platform 210 will not tip when supported by feet 301 resting without attachment on support surface A. It will be appreciated that platform 210 may have other configurations as required by the particular application and may be integral with the product display or other article storage system. For example, platform 210 could have a post-like form for receiving annularly shaped merchandise.

Referring in particular to FIGS. 7-10, a first embodiment of weight sensors 300 comprises a plate member 302 comprising first (input) and second (base) sections 304 and 306 connected by an elastic parallelogram linkage, generally denoted 310. As shown, mounting holes 303 advantageously are provided in input plate section 304 for mounting section 304 to platform flange 218 using a conventional fastener 305. Support feet 301 are mounted on base plate section 306, as shown, in a conventional manner, such as with an adhesive. It will be appreciated that with plate section 304 of sensors 300 mounted to the respective scale flanges 218 and scale 200 supported on support surface A by sensor feet 301, vertical force due to weight loading on scale 200 will cause proportional relative displacement between the two sections 304 and 306 of plate member 302.

Elastic linkage 310 preferably comprises a series or parallel links 311 defined by a serpentine slot arrangement 312 formed in plate member 302, advantageously by punching or machining to minimize fabrication costs. As shown, slot arrangement 312 is symmetrical with respect to both the longitudinal and transverse (width direction) center lines of plate member 302. Each half (with respect to the transverse center line) of slot arrangement 312 comprises a slot 313 extending from the side edge 307 of plate member 302, a series of slots 314 and grooves 315 forming links 311, and a slot 316 extending to the center or plate member 302. As shown, elastic linkage 310 advantageously comprises two sets of two links 311 each. Slots 314 define the longitudinal edges of links 311, while grooves 315 define web or joint portions 317 of reduced thickness connecting the opposite ends of each link 311 to plate sections 304 and 306, respectively. As shown, the grooves defining joint portions 317A and 317B are formed in opposite surfaces of plate member 302, so that joint portions 317A and 317B face in opposite directions.

As shown in FIGS. 7 and 10, links 311 advantageously are, but need not be parallel to the transverse center-line of plate member 302. An alternative embodiment of plate member 302, in which links 311 have an inclined orientation, is shown in FIG. 11 as an illustrative example. The stiffness of elastic linkage 310, and hence the degree of displacement of plate sections 304 and 306 in response to weight loading of scale 200, is determined by the length, width and thickness of joint portions 317. A will be appreciated by those skilled in the art, the stiffness is directly proportional to the joint length and width, and varied as the cube of the thickness. For a platform scale having nominal capacity of 18 pounds per weight sensor, and with the transducer unit described hereinbelow, a linkage 310 formed in plate member 302 made of 6061-T6 aluminum and having the following dimensions has proven to be satisfactory:

overall (including joint portion) link length (transverse plate direction): 1.25 inches
link width and thickness: 0.188 inches
joint length and width (longitudinal and transverse plate directions): 0.188 inches
joint thickness: 0.060 inches The relative displacement of plate sections 304 and 30 in response to weight loading of platform scale 200 is sensed by a transducer unit, generally denoted 400, comprising a pair of opposed polarity magnets 410 mounted on plate section 306 and Hall effect or other magnetic sensor 412 mounted on plate section 304. (It will be appreciated that alternatively, magnets 410 can be mounted on plate section 304 and sensor 412 can be mounted on plate section 306). Sensor 412 advantageously is a Model SS-94A1 sensor manufactured by the Micro Switch division of Honeywell, Inc., which has a 5 volt linear range output signal with an 8 volt power supply. Transducer unit 400 senses displacement similarly to the Hall effect transducer disclosed in U.S. Pat. No. 4,738,325, which is commonly owned by the assignee of the present invention, and which is hereby incorporated herein by reference. As in the case of the 325 transducer, no contact is permitted between magnets 410 and sensor 412 in order to avoid friction which would impair the performance of the system.

As shown, transducer unit 400 is mounted on plate member 302 on mounting surfaces formed by the central portion 318 of slot arrangement 312. Referring particularly to FIG. 10, the slot arrangement central portion 318 advantageously has two enlarged areas 318A and 318B for receiving magnets 410 and Hall effect sensor 412, respectively. Areas 318A and 318B respectively define two transversely spaced (width direction) mounting surfaces 319A and 319B which support magnets 410 and Hall effect sensor 412 with a predetermined transverse gap therebetween. A nominal gap of 0.001 inch has proven satisfactory for the specific weight sensor embodiment described herein. Advantageously, mounting surfaces 319A and 319B are arranged relative to each other as shown so that they can be machined from the same side of a milling machine spindle and hence variations in cutter diameter will not affect the gap between sensor 412 and magnets 410.

Magnets 410 advantageously are samarium cobalt magnets having a maximum specific energy (B x H product) of 20, and the following dimensions: 0.90×0.120×0.157 inches. (The magnets are configured so that the direction of magnetization is through the short dimension.) Referring to FIGS. 7 and 14, magnets 410 are supported on mounting surface 319A by a carrier plate 411 made of a magnetic alloy such as 400 series stainless steel, and secured to mounting surface 319A by an adhesive. Magnets 410 are secured to carrier plate 411, and Hall effect sensor 412 is secured to mounting surface 319B by an adhesive as well. Preferably, a slow curing adhesive, such as an epoxy type, is used to permit the necessary positioning of the magnets relative to the sensor to obtain zero point adjustment of the magnetic field sensed by the sensor. It will be appreciated that once the sensor is positioned, the magnets can be adjusted and will hold their adjusted position (if rough handling is avoided) until the adhesive sets for permanent fixation since the magnets also hold to carrier plate 411 by magnetic attraction.

To facilitate proper positioning of magnets 410 an sensor 412, both are preferably mounted to the corresponding mounting surfaces 319A and 319B using identical pairs of guide brackets 420, as shown in FIG. 14. Referring to FIGS. 12 and 13, each bracket 420 advantageously is made of plastic, such as Delrin manufactured by E. I. duPont de Nemours & Co., and comprises a lower base 421 having a hollow projecting mounting post 422 formed on the plate abutting surface, and a recessed portion 423 communicating with the bore of post 422 and shaped to receive a conventional hex nut. Mounting post 422 mates with mounting holes 330 formed in plate member 302 so that each bracket 420 can be precisely mounted on plate member 302 and releasably secured thereto using a conventional bolt extending through post 422 and engaging a nut mounted in recessed portion 423.

Each bracket 420 further comprises an upstanding flange 424 on the upper edge thereof defining a ledge 425, and an angled leg member 426 extending from flange 424, as shown. Brackets 420 are dimensioned such that when they are mounted in opposing relationship on plate sections 304 and 306, the respective flanges 424 and ledges 425 of the opposing brackets define guide channels for aligning magnet carrier plate 411 and Hall effect sensor 412 (plate 411 preferably is made the same width as sensor 412 so that identical brackets can be used) with the longitudinal axis of plate member 302, thereby providing symmetry of sensor 412 relative to the longitudinal and transverse (thickness direction) axes. Further, the portion 426A of each leg member 426 cooperates with mounting surfaces 319A and 319B and ledges 425 to restrain the carrier plate 411 and sensor 412 from tilting during assembly. In addition, with magnets 410 abutted against the lateral surface 427 of leg member portion 426A, surfaces 427 serve to precisely position magnets 410 longitudinally while allowing magnets 410 to be readily displaced (using a probe-like tool) transversely to the longitudinal axis (in the thickness direction). Consequently, during assembly, orthogonal symmetry of transducer unit 400 relative to plate member 302 is readily achieved because sensor 412 is automatically aligned with the longitudinal axis, the longitudinal position of sensor 412 can be readily ajusted relatively to the fixed longitudinal position of magnets 410 to properly center the sensor over the magnets; and the transverse position of magnets 410 can be readily adjusted to the then fixed position of sensor 412 in order to accomplish the aforesaid zero adjustment of the magnetic field relative to sensor 412.

It will be appreciated that brackets 420 advantageously can be retained in place after assembly has been completed, and the mounting adhesive has set to rigidly bond magnets 410 and sensor 412 to the respective mounting surfaces 319A and 319B, in order to guard transducer unit 400 against damage due to physical contact.

Referring in particular to FIGS. 6-8, weight sensor 300 preferably also includes stop members 360 mounted on plate section 304 so as to respectively extend over slots 313 and adjacent portions 361 of plate section 306 having a slightly reduce thickness, thereby providing overload protection for weight sensor 300. In the disclosed embodiment, portions 361 having a thickness of 0.17 inch, thereby creating a gap of 0.01 inch between portions 361 and the corresponding stop members 360 when weight sensor is in an unloaded state, have proven satisfactory.

As shown in FIGS. 6 and 7, each weight sensor 300 advantageously has the electrical circuitry for performing desired signal processing of the transducer unit 400 output signals physically mounted on a printed circuit board 500 (shown diagrammatically) which is physically mounted using conventional space bushing connectors 502 to weight sensor plate member 302. conventional electrical connector 504 (also shown diagrammatically) is also advantageously mounted on printed circuit board 500 for electrically connecting the signal outputs of the weight sensor to control circuitry 506 for performing desired antitheft/article input and removing monitoring operations.

As shown diagrammatically in FIG. 6, the scale control circuitry 506 and a speaker 508 for generating audible local alarm, acknowledgement and other tone signals advantageously are also physically housed within scale 200.

It will be appreciated from the foregoing that the use of a parallelogram type of elastic linkage 310 prevents angular relative motion between sensor 412 and magnets 410, and also constrains the platform scale 200 to vertical motion. The avoidance of angular motion permits a smaller air gap between sensor 412 and magnets 410, which enhances sensitivity.

It will also be appreciated from the foregoing that the length of plate mexler 302 has no effect on the operation of weight sensors 300. If desired, each weight sensor 300 can have a shortened plate member 302 with only one support foot 301, in which case at least three such sensors 300 are needed to support a platform 210. This scale arrangement is particularly suited to large or irregularly shaped platforms.

It will be further appreciated that slot arrangement 312 defining linkage 310 can be fabricated entirely by vertical milling of plate member 302 with an end mill, and that the throughgoing slots 313, 314 and 316 can generally be punched rather than machined for further fabrication economies. (However, in order to precisely position transducer unit 400, mounting surfaces 319A and 319B preferably should be machined.)

Figure 15:
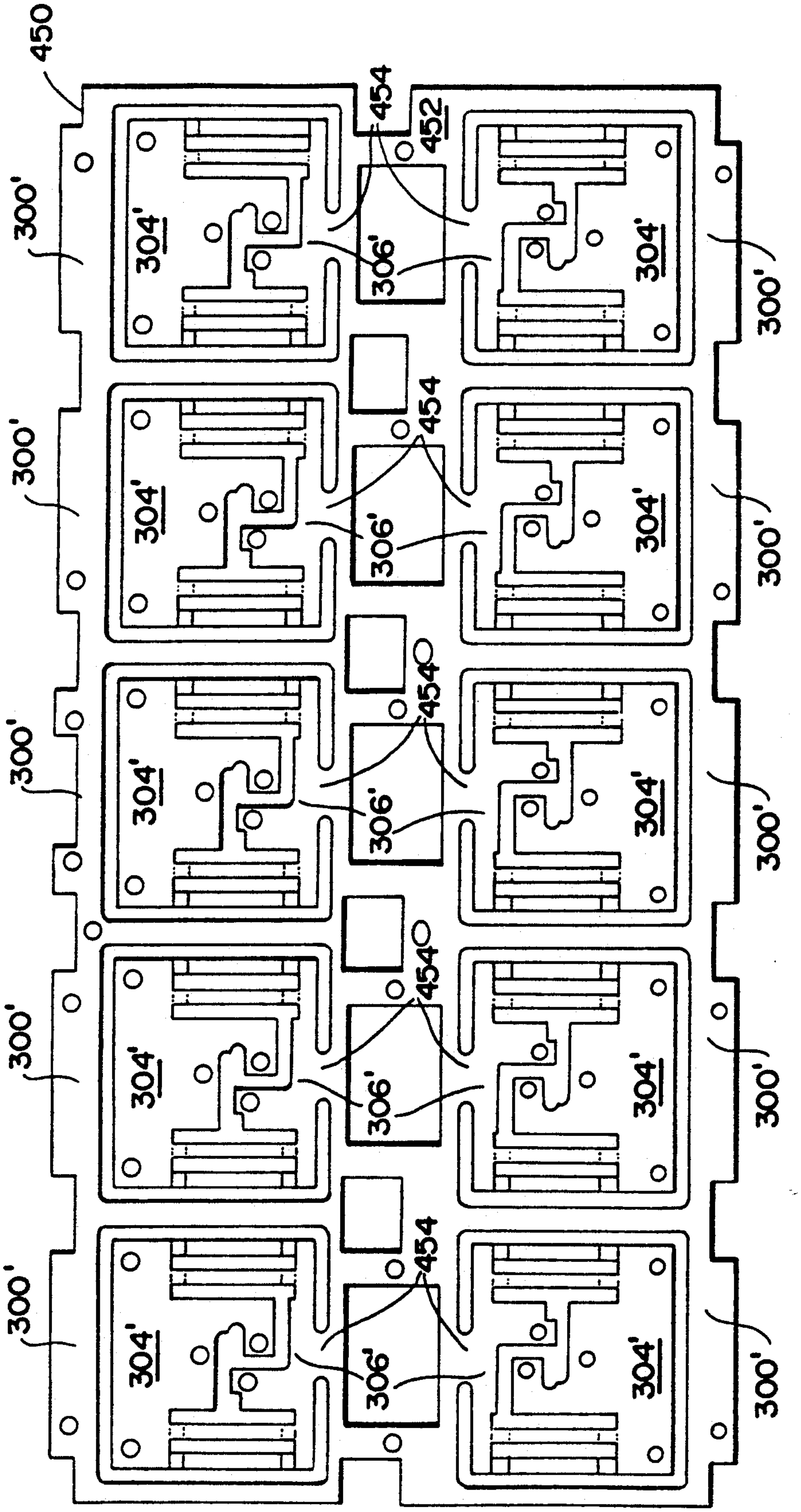
FIG. 15 is a diagrammatic plan view, with details omitted for the sake of clarity, of a portion of a third embodiment of weight sensor according to the present invention.

When only a small platform 210 is required for an application, a single weight sensor 300 may be used, if base section 306 of plate member 302 is supported or fixed in a manner to prevent tipping. In some applications, e.g., monitoring system for cash register drawers, multiple small platforms in close proximity to each other are required. Referring to FIG. 15, additional fabrication efficiencies are obtained if multiple weight sensors are fabricated from a common metal plate 450. In this embodiment, the input plate sections 304, of the respective sensors 300′ connected to the individual platforms (not shown) are isolated from each other after fabrication is completed, but the supporting base sections 306, remain connected to a common support area or framework 452 of the metal plate 450, as shown. To avoid mechanical interaction between the individual weight sensors due to twisting forces, each base section 306, preferably should be connected to the common plate framework 452 by a single tongue 454 of minimum width, as shown.

Figure 16:
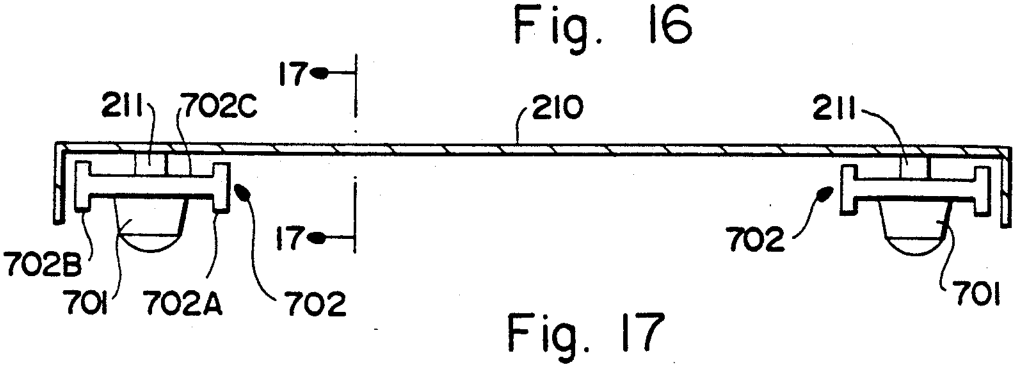
FIG. 16 is an end elevation cross-sectional view of platform scale having a fourth embodiment of a weight sensor according to the invention.
Figure 17:
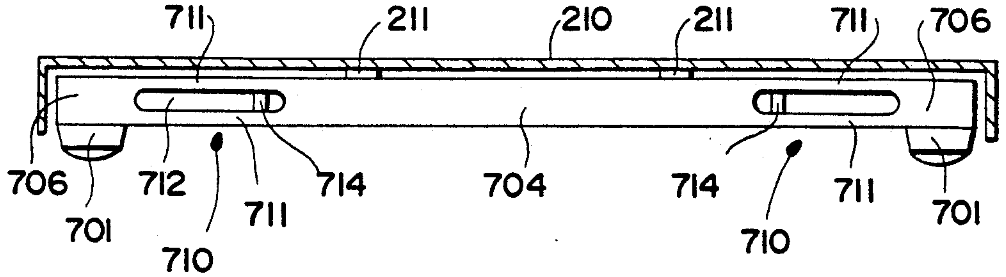
FIG. 17 is a cross-sectional view taken along line XVII—XVII of the platform scale of FIG. 16.
Figure 18:
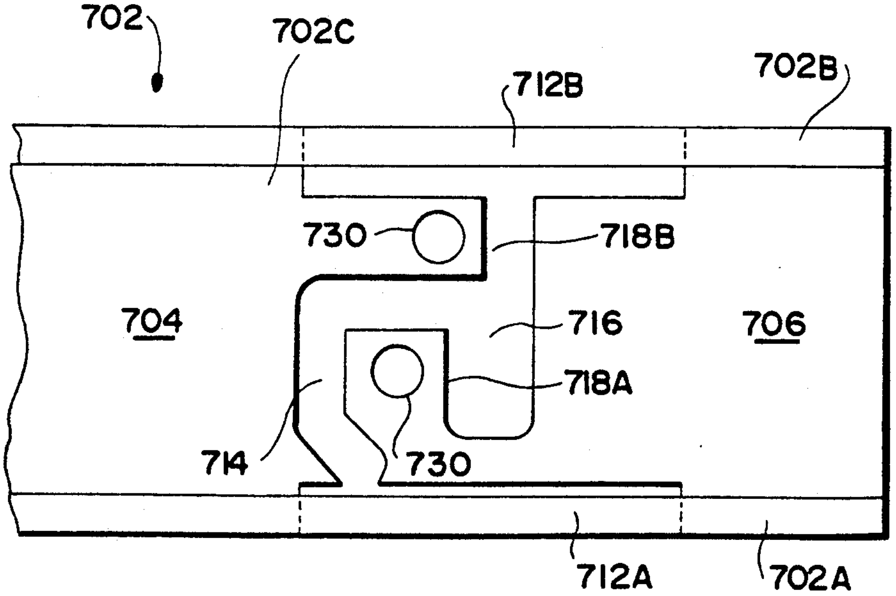
FIG. 18 is a plan view of a portion of the weight sensor shown in FIG. 16.

Referring to FIGS. 16-18, a further weight sensor embodiment 700 will now be described which can be fabricated with minimal machining, or punching and machining, and which has a narrow profile relative to the weight sensor embodiments 300 and 300' of FIGS. 6–15. As shown, weight sensor 700 comprises an elongate bar member 702 having an "I" shaped profile defined by two flange portions 702A and 702B and a central web portion 702C joining the two flange portions. Bar member 702 also comprises an intermediate input section 704 and two end base sections 706 connected to the intermediate section by two elastic parallelogram linkages, generally denoted 710. A platform 210 is supported on the intermediate section 704 by posts 211, and each base section 706 is provided with a depending, preferably elastomeric foot 701.

Referring particularly to FIGS. 17 and 18, each elastic linkage 710 comprises two relatively elastic parallel links 711 formed in each flange portion 702A, 702B by machining a slot, generally denoted 712, in alignment with the longitudinal center line of bar member 702. As shown, each slot 712 has a depth greater than the width (transverse to the longitudinal center line) of flange portions 702A, 702B, and a thickness (transverse to the width direction) at least equal to the thickness of central web portion 702C, so that each slot 712 extends into central portion 702C, thereby isolating links 711 from central portion 702C. As will be appreciated by those skilled in the art, the thickness of slots 712 determines the elasticity of links 711. Alternatively, the flexibility of the linkage can be controlled by enlarging the width of the ends of each slot 712 (e.g., by machining the slot with a larger terminal radius) to provide flexible joint portions (not shown) similar to joint portions 317 in the FIG. 6–15 embodiments.

Slots 712A and 712B (FIG. 18) in each linkage 710 are joined by a serpentine slot arrangement 714 which has an enlarged central area 716, similar to central portion 318 described hereinabove, defining the longitudinally spaced mounting surfaces 718A and 718B which respectively support magnets 410 and Hall effect sensor 412 of transducer unit 400 in the same manner as the embodiments of FIGS. 6–15. (Only mounting holes 730 for guide brackets 420, and not transducer unit 400 or brackets 420, are shown in FIG. 18 for the sake of clarity.) As shown, the depth of slot 712A is preferably kept to a minimum consistent with the foregoing in order that the portion of central web portion 402C supporting magnets 410 may be as strong as possible, and slot 712B preferably has a depth which is greater than that of slot 712A in order to provide clearance for the electrical leads associated with Hall effect sensor 412.

A sensor 700 having a bar member 702 made from 6061-T6 aluminum and having the following dimensions provides a nominal weight sensing range of 15 kilograms using the embodiment of transducer 400 described hereinabove:

overall width (transverse to the longitudinal center line) of bar member 702: 1.25 inch width of bar member flange portions 702A, 702B: 0.125 inch thickness (transverse to the width direction) of bar member flange portions 702A, 702B: 0.375 inch thickness of bar member central portion 702B: 0.187 inch length of slots 712 (rectangular portion): 1.00 inch spacing of slots 712 from end of bar member (measured from center of slot): 1.25 inches thickness of links 711: 0.094 inch Although a small scale platform 210 as described hereinabove can be used with weight sensor 700, weight sensor 700 is particularly adapted for use in groups to support relatively large platforms. Platforms so supported feature a very low height relative to their length and width. In addition, sensor 700 is not sensitive with respect to the point of application of force to the feet 701, which is important in avoiding errors when the feet are resting on an irregular surface. Further, since two transducers 400 are readily incorporated into a single sensor bar member 702, rectangular platforms can be supported on four feet using just two sensors 700. This allows the tipping condition to be avoided which is created when such platforms are supported on three feet and loads are placed too far off center. Still further, sensor 700 avoids the torque load which would have to be withstood if the transducers were mounted in individual sensors. This saves manufacturing costs since the necessary reinforcement at the point of attachment to the platform, and the number of fasteners, are reduced. Also, since weight sensor 700 is narrower than the embodiments of weight sensor 300 described hereinabove, feet 701 can be placed very close to the edge of the platform for better stability against tipping.

Figure 19:
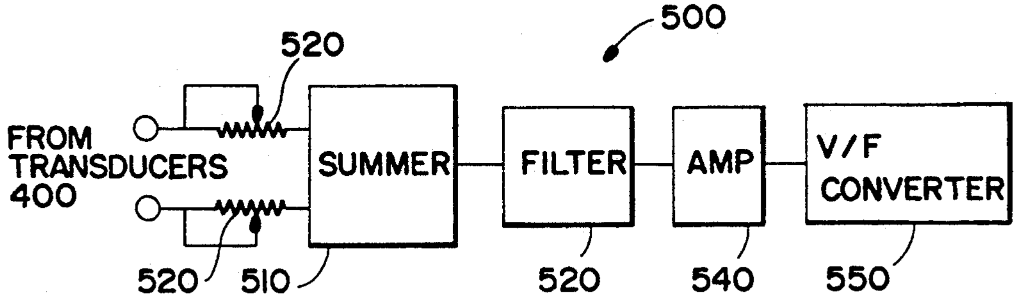
FIG. 19 is a schematic circuit diagram of weight signal processing circuitry for the weight sensors of FIG. 7.

A signal indicative of the total weight on a scale 200 is obtained by electrically summing the output signals obtained from the transducer unit 400 of each weight sensor 300. The circuitry of FIG. 3, wherein a separate frequency counter is provided for each weight sensor and the digital signals produced by the frequency counters are summed by a CPU, may be used. Alternatively, the analog circuit 500 of FIG. 19 may be used to provide a more economical system. As will be appreciated, circuit 500 comprises a conventional analog summer 510 to which are connected the outputs from the respective weigh sensor transducer units 400. As shown, a span-adjust variable resistor 520 is connected between the output of each transducer unit 400 and the input to summer 510 in order to normalize the transducer outputs so as to compensate for mechanical variations in the individual weight sensors 300. The output of summer 510 is filtered by a conventional RC filter 530, amplified by a conventional amplifier 540 and then input to a conventional voltage to frequency converter 550 to produce a digital output signal having a frequency proportional to the sensed weight.

In an anti-theft application, computer controlled signal processing and alarm acknowledgment signal generating circuitry similar to that described hereinabove may be utilized as control circuitry 500 for performing desired ones of the theft detection and alarm routines described hereinabove. In addition, in order to permit simple calibration of a scale 200 to a particular antitheft or other article input and removal monitoring application, control circuitry 500 advantageously is also programmed to perform the following CALIBRATE mode of operation, which advantageously is enabled using a special user activated switch S4 (FIG. 3).

Figure 20A:
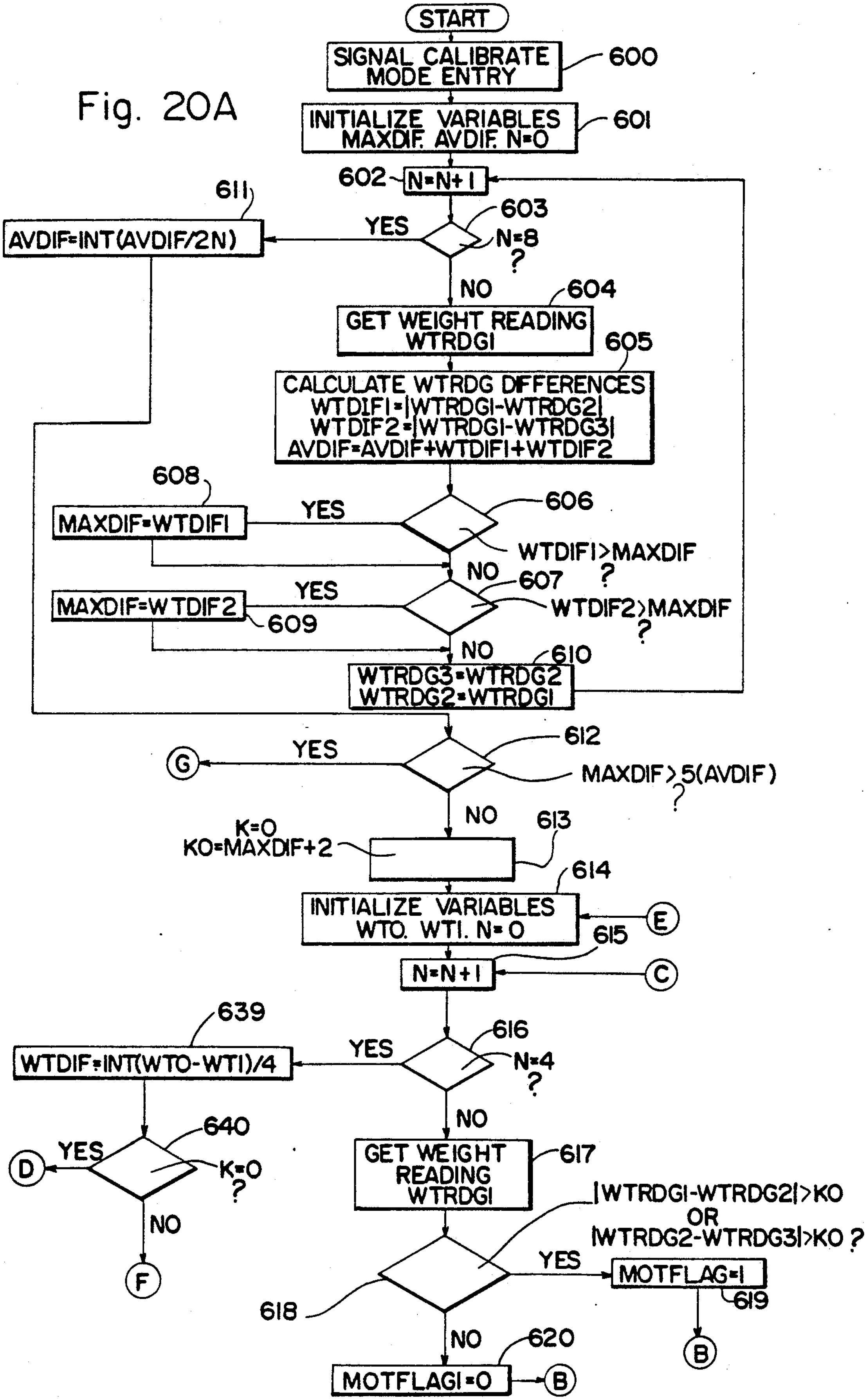
FIGS. 20A-20C are a flow chart of a calibration routine according to the present invention.
Figure 20B:
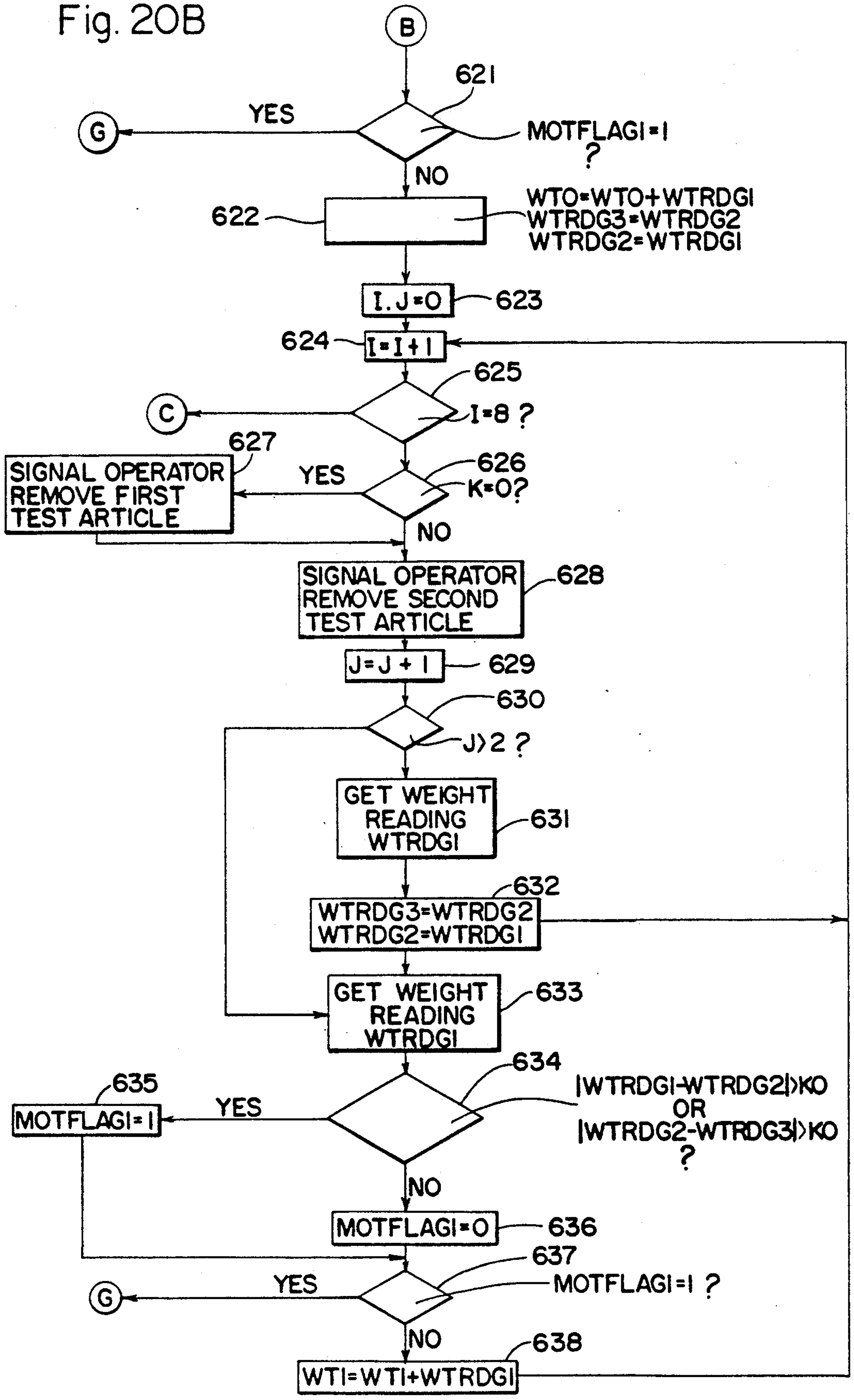
Figure 20C:
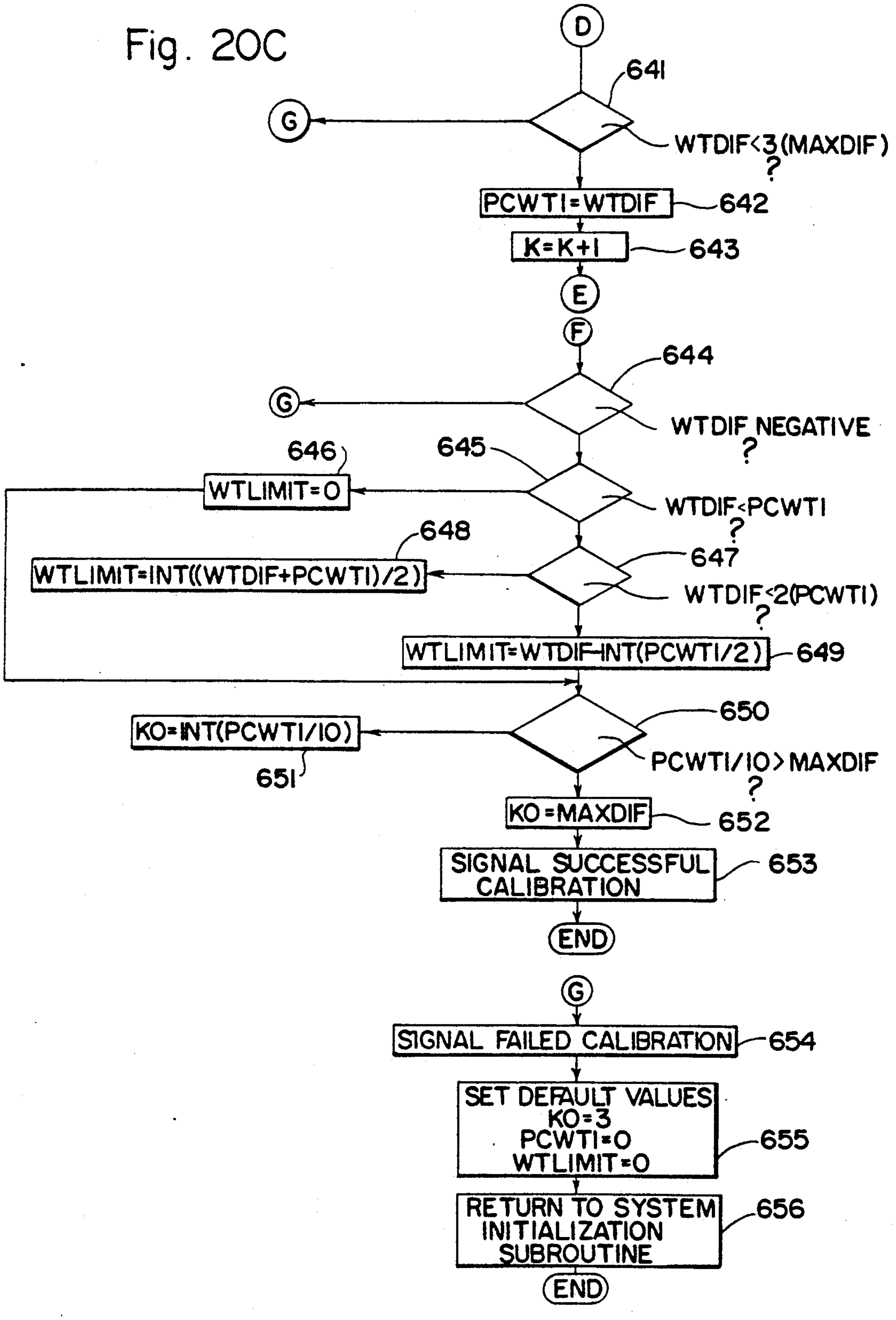

In the following description it will be assumed that the system has already been initialized, and hence that operations similar to those shown in blocks 57 and 58 of FIG. 4A above have been carried out. Referring to FIGS. 20A–20C, in which the variables corresponding to those used in the routines shown in FIGS. 4A–4D and 5 hereinabove have been given the same names, when the CALIBRATE routine has been enabled, control is transferred to block 600, where an audible or visual signal is caused to be generated confirming to the operator that the calibration mode has been entered and the system is ready to proceed with calibration . Control is then transferred to block 601, where variables MAXDIF, AVDIF, MOTFLAGl and counter N are all initialized to zero.

Control is then transferred to a measurement stability test routine including blocks 602–611. In this routine, successive weight readings WTRDGl, WTRDG2, and WTRDG3 are repetitively compared to compute the average measurement noise for an undisturbed system. Specifically, a weight reading comparison loop is entered by: incrementing counter N in block 602 and testing N in decision block 603 to determine whether the predetermined loop repetition limit (e.g., 8, as shown) has been reached; sensing the current scale weight WTRDGl in block 604 in a fashion similar to that described for block 57 (FIG. 4A) hereinabove, but using the output of circuit 500 (FIG. 19) rather than summing the individual weight sensor outputs in the CPU; calculating weight reading difference variables WTDIFl and WTDIF2 and AVDIF in block 605 using the formulae shown; comparing WTDIFI and WTDIF2 in decision blocks 606 and 607, and if WTDIFl is greater than the present value of variable MAXDIF, then setting MAXDIF equal to WTDIFI in block 608, and if WTDIF2 is greater than the present value of MAXDIF (which may have been set in block 608), then setting MAXDIF equal to WTDIF2 in block 609; setting variable WTRDG3 equal to WTDG2 and variable WTRDGl equal to WTRDGl in block 610; and successively retracing the weight reading comparison loop of blocks 602–610 until block 603 determines that N=8, at which time control is transferred to block 611, where the variable AVDIF is set equal to the integer value of AVDIF/2N. This ends the measurement stability test routine.

Control is then transferred to decision block 612, where the present value of MAXDIF is compared with a value equal to a predetermined multiple (e.g., 5 as shown) of AVDIF to detect the presence of a disturbance during the measurement stability test routine. If a disturbance is detected (MAXDIF>5(AVDIF)), then control is transferred to a calibration abort routine to be described hereinafter (blocks 654–656). Otherwise, control is transferred to block 613, where a counter K, signifying which test weight measurement is being performed, is set to zero; and variable KO, the motion limit described above for detecting a stable weight condition, is set to a provisional value equal to MAXDIF+2. Control is then transferred to block 614, which begins a test weight measurement routine to measure the weight of items to be detected, and where variable WTO and counter N are initialized to zero.

The test weight measurement routine includes blocks 614–640. Blocks 615 and 616, in which N is respectively incremented and compared with a predetermined routine repetition limit (e.g., 4, as shown), control retracing of the routine. Blocks 617–622 constitute a pre-removal gross weight measurement subroutine in which a weight reading is obtained (block 617) and a motion check is performed (blocks 618–621) to determine the existence of disturbance during the weight reading. Specifically, in block 618 the absolute differences between successive weight reading WTRDGl, WTRDG2 and WTRDG3 are compared with variable KO, a shown. If any of the differences are greater than KO, then fla MOTFLAGl is set equal to 1 in block 619 and decision block 621 causes control to be transferred to the calibration abort routine (blocks 654–656).

If block 618 determines that none of the differences ar greater than KO, then MOTFLAGl is set to zero in block 620, and control is accordingly transferred by block 621 to block 622, where WTO is set equal to WTO+WTRDGl, WTRDG3 is set equal to WTRDG2 and WTRDG2 is set equal to WTRDGl. The present value of WTO corresponds to the measured gross weight (including the platform and article storage device weight) of the products on the scale prior to removal of a test item.

Control is then transferred to block 623, which begins a post-removal gross weight measurement subroutine. Subroutine counters I and J are initialized to zero in block 623, I is incremented in block 624, and I is compared in decision block 625 with a limit value (e.g., 8, as shown) corresponding to the desired duration of the test measurement interval. Control is then transferred to block 626, where the state of counter K is determined. Since K=0, control is transferred to block 627, where another audible/visual signal is caused to be generated signifying that the operator is to remove a first test item, representing the smallest removable item to be detected. In order to allow time for the operator to remove a test item, a subloop comprising blocks 629–632 is repetitively performed a predetermined number of times (e.g., 2, as shown) under the control of blocks 629 and 630, which respectively increment subloop counter J and determine whether J exceeds the loop repetition limit. While control is in the subloop, the weight reading WTRDGl is sensed (block 631), and WTRDG2 and WTRDG3 are updated (block 632). (Control is transferred from block 632 to block 624 so that counter I is incremented concurrently with counter J.) Following completion of this subloop (when block 630 determines J '2), control is transferred to the sequence of blocks 633–638 to obtain a measurement of the gross weight of articles on the scale after removal of the first test item. The sequence of blocks 633–638 is identical to the pre-removal gross weight measurement subroutine (blocks 617–622) described hereinabove, except that in block 638, WTl is set equal to WTl+WTRDGl. Once this subloop has been completed, control is transferred back to block 624, and blocks 624–638 are repeated until block 625 determines that I=8, which causes control to be transferred to block 615, for repetition of the block 615–638 portion of the test weight measurement routine until block 616 determines that N=4. When that determination is made, control is transferred to block 639, where the averaged net weight of the test item removed, WTDIF, is computed by setting WTDIF equal to the integer value of (WTO−WTl)/4. This ends the test weight measurement routine.

Control is then transferred to decision block 640 of the main routine, where the state of counter K is determined. Since K=0, control is transferred to decision block 641, where it is determined if the variable WTDIF calculated in the test weight measurement routine is less than a predetermined multiple (e.g., 3, as shown) of the variable MAXDIF. If so, control is transferred to the calibration abort routine (blocks 654–656), on the basis that the test weight removed is too small to reliably detect. (It will be appreciated that the determination of block 641 also tests for the condition where a weight was added rather than removed during the test measurement, since the resulting negative value of WTDIF is less than 3 (MAXDIF)). If WTDIF is not less than 3 (MAXDIF), then control is transferred to block 642, where a variable PCTWTl, designating the piece weight of the smallest item to be signaled during an anti-theft or article input/removal monitoring mode of operation, is set equal to WTDIF.

Control is then transferred to block 643, where the counter K is incremented, and then back to block 614, where the test weight measurement routine described above (blocks 614–640 is repeated. However, with K now set to 1, decision block 626 causes control to be transferred to block 628, which causes the operator to be signaled to remove a second test item, different from the first test item, for which it is desired to establish a second stage alarm. (It will be appreciated that the same or different signals can be produced in response to blocks 627 and 628).

When the test weight measurement routine has been completed for the second test item, decision block 645, where the WTDIF value is tested for a negative value, indicating that weight was added rather than removed during the second test measurement. If WTDIF is negative, then control is transferred to the calibration abort routine (blocks 654–656); and if not, control is passed to decision block 645, where the present WTDIF (obtained from the second test weight measurement) is compared with PCWT. If WTDIF<PCWT1, then a second alarm limit variable WTLIMIT is set equal to zero in block 646. If WTDIF is not less than PCWT1, then WTDIF is compared with a predetermined multiple (e.g., 2, as shown) of PCWT1 in decision block 647. If WTDIF is less than 2(PCWT1), then WTLIMIT is set equal to the integer value of (WTDIF+PCWT1)/2 in block 648; and if not, WTLIMIT is set equal to WTDIF2 minus the integer value of PCWT1/2 in block 649.

Control is then transferred to decision block 650, where a predetermined fraction (e.g., 1/10, as shown of PCWT1 is compared with MAXDIF. If (PCWT1/10)>MAXDIF, indicating that the smallest item to be removed has a relatively large weight, then variable KO is set equal to the integer value of PCWT1/10 in block 651 in order to provide a faster system response by relaxing the stability criterion KO; and if not, KO is set equal to MAXDIF in block 652. Control is then transferred to block 653, where a signal is caused to be generated signaling to the operator that the system has been successfully calibrated.

Block 653 ends the CALIBRATE routine when no determination is made in the course of performing the routine to transfer control to the calibration abort subroutine. Referring to blocks 654–655, which comprise the calibration abort routine, if such determination is made, block 654 causes another audible/visual signal to be generated signifying that calibration has not been achieved; default values for KO, PCWTl, and WTLIMIT are set in block 655; and block 656 causes control to be transferred to the initialization subroutine (e.g., blocks 57 and 58 in FIG. 4A) of the main control routine of the scale control circuitry. The anti-theft/article input and removal monitoring routines which have been programmed into the scale control circuitry can then be performed using the values of KO, PCWTl and WTLIMIT which were established by computation or default during the CALIBRATE mode as limits.

While the present invention has been described with reference to particular preferred embodiments, the invention is not limited to the specific examples given, and other embodiments and modifications can be made by those skilled in the art without departing from the spirit and scope of the invention.

What is claimed is:

1. Self-calibrating apparatus for monitoring article input and removal from article storage apparatus, said monitoring apparatus comprising:

weight sensing means for producing an output signal corresponding to the weight of the article storage apparatus when loaded with articles to be input or removed from the article storage apparatus during use thereof;

means for measuring the stability of weight measurements obtained from said weight sensing means output signal and for producing a first limit value indicative of the noise in said weight sensing means output signal;

test weight measurement means responsive to said weight sensing means for obtaining a first test measurement, for signaling an operator to remove a test article from the article storage apparatus, for obtaining a second test measurement during predetermined time period following a signaling of said operator, and for comparing said first and second test measurements to obtain a calibration weight value; and means for comparing said calibration weight value with a predetermined multiple of said first limit value and for producing a signal indicative of an invalid calibration if said calibration weight value is less than said predetermined multiple of said first limit value.

2. The self-calibrating apparatus of claim 1 wherein said stability measuring means comprises means for cyclically:

comparing a current weight reading obtained from said weight sensing means output signal with each of two different prior weight readings to derive first and second difference values, said first difference value corresponding to the difference between said current weight reading and the more recent of said two prior weight readings, and said second difference value corresponding to the difference between said current weight reading and the older of said two prior weight readings;

means for selecting one of said first and second difference values as said first limit value if at least one of said first and second difference values exceeds the first limit value produced during the immediately prior cycle;

means for producing a second limit value corresponding to the second limit value produced during the immediately prior cycle plus the combined value of said first and second difference values produced during the current cycle;

means for comparing said first limit value with a predetermined multiple of said second limit value and for producing a signal indicative of an invalid calibration if said first limit value is less than said predetermined multiple or said second limit value; and means for setting a third limit value to be proportional to said first limit value if said first limit value is nor less than said predetermined multiple of said second limit value.

3. The self-calibrating apparatus of claim 2 wherein said test weight measurement means further comprises means for comparing successive weight reading differences with said third limit value and for producing a signal indicative of an invalid calibration if any of said successive weight reading differences exceeds said third limit value.

4. The self-calibrating apparatus of claim 3 further comprising means for increasing said third limit value if said calibration weight value is more than a predetermined multiple of said first limit value.

* * * * *